United States Patent
Suh

(10) Patent No.: US 10,831,340 B2
(45) Date of Patent: Nov. 10, 2020

(54) MOBILE TERMINAL PERFORMING METHOD OF PROVIDING RECIPE FOR MAKING A BEVERAGE BY A BEVERAGE-MAKING APPARATUS AND RECORDING MEDIUM RECORDING PROGRAM PERFORMING THE METHOD

(71) Applicant: LG ELECTRONICS INC., Seoul (KR)

(72) Inventor: Mina Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 15/806,386

(22) Filed: Nov. 8, 2017

(65) Prior Publication Data

US 2018/0129379 A1 May 10, 2018

(30) Foreign Application Priority Data

Nov. 10, 2016 (KR) ........................ 10-2016-0149577

(51) Int. Cl.
*G06F 3/048* (2013.01)
*G06F 3/0482* (2013.01)
(Continued)

(52) U.S. Cl.
CPC ............ *G06F 3/0482* (2013.01); *A47J 31/00* (2013.01); *A47J 31/44* (2013.01); *C12C 13/00* (2013.01);
(Continued)

(58) Field of Classification Search
CPC ....... G06F 3/0482; G06F 3/048; C12C 13/00; C12C 13/10; A47J 31/00; A47J 31/44; G07F 13/065; B67D 1/0021; H04W 4/80
See application file for complete search history.

(56) References Cited

U.S. PATENT DOCUMENTS

2012/0251661 A1* 10/2012 Toombs ................... C12C 7/28
426/13
2015/0046877 A1 2/2015 Cuppari et al.
(Continued)

FOREIGN PATENT DOCUMENTS

EP 2759991 7/2014
JP 2015153286 8/2015
(Continued)

OTHER PUBLICATIONS

Extended European Search Report in European Application No. 17200824.5, dated Dec. 11, 2017, 7 pages (with English translation).
(Continued)

*Primary Examiner* — Jeanette J Parker
(74) *Attorney, Agent, or Firm* — Fish & Richardson P.C.

(57) ABSTRACT

A mobile terminal includes a wireless communication unit configured to communicate with a beverage-making apparatus; a display unit; and at least one processor. The at least one processor is configured to: receive a first request for selecting a first ingredient included in a first ingredient category for making a beverage with the beverage-making apparatus; display at least one recommended second ingredient, among a plurality of second ingredients included in at least one second ingredient category, that is determined based on the selected first ingredient; receive a second request for selecting a second ingredient among the at least one recommended second ingredient that is displayed; and display, through the display unit, beverage recipe information related to a beverage-making recipe that includes the selected first ingredient and the selected second ingredient for making the beverage using the beverage-making apparatus.

13 Claims, 24 Drawing Sheets

(51) Int. Cl.
*C12C 13/00* (2006.01)
*A47J 31/00* (2006.01)
*G07F 13/06* (2006.01)
*C12C 13/10* (2006.01)
*A47J 31/44* (2006.01)
*B67D 1/00* (2006.01)
*H04W 4/80* (2018.01)

(52) U.S. Cl.
CPC ............ *C12C 13/10* (2013.01); *G07F 13/065* (2013.01); *B67D 1/0021* (2013.01); *H04W 4/80* (2018.02)

(56) References Cited

U.S. PATENT DOCUMENTS

| | | |
|---|---|---|
| 2016/0090288 A1 | 3/2016 | Givens et al. |
| 2016/0255991 A1 | 9/2016 | Givens et al. |
| 2018/0072972 A1* | 3/2018 | Shin ........................ C12C 13/10 |
| 2018/0199751 A1* | 7/2018 | Mitchell .............. A47J 31/5253 |
| 2019/0172297 A1* | 6/2019 | Schwarber .............. G07F 9/006 |

FOREIGN PATENT DOCUMENTS

| | | |
|---|---|---|
| KR | 1020110035380 | 4/2011 |
| KR | 1020120126157 | 11/2012 |
| KR | 1020140015862 | 2/2014 |
| KR | 101500981 | 3/2015 |
| KR | 1020160124508 | 10/2016 |
| WO | WO2016141293 | 9/2016 |

OTHER PUBLICATIONS

Summons to Attend Oral Proceedings in European Application No. 17 200 824.5, dated Jan. 7, 2020, 19 pages.

Korean Office Action in Korean Application No. 10-2016-0149577, dated Mar. 28, 2020, 68 pages (with English translation).

\* cited by examiner

MOBILE TERMINAL PERFORMING METHOD OF PROVIDING RECIPE FOR MAKING A BEVERAGE BY A BEVERAGE-MAKING APPARATUS AND RECORDING MEDIUM RECORDING PROGRAM PERFORMING THE METHOD

CROSS-REFERENCE TO RELATED APPLICATIONS

This application claims priority under 35 U.S.C. 119 and 365 to Korean Patent Application No. 10-2016-0149577, filed on Nov. 10, 2016, in the Korean Intellectual Property Office, the disclosure of which is incorporated herein by reference.

TECHNICAL FIELD

The present disclosure generally relates to a mobile terminal, and more particularly, to a mobile terminal that is communicative with a beverage-making apparatus to exchange information for making a beverage.

BACKGROUND

Various types of beverages are made via fermentation. Such beverages are typically made using ingredients that are combined and fermented to yield the resulting beverage. As an example, beer is an alcoholic beverage that is brewed by filtering wort, adding hops to the wort, and then fermenting the resulting wort mixture with yeast. Wort is typically made with malt, which is made from germinated barley.

Ingredients for brewing beer typically include water, malt, hops, yeast, flavor additives, and the like. The yeast is often referred to as leaven, and is typically added to malt to induce fermentation. The yeast may also facilitate the generation of alcohol and carbon dioxide (or carbonic acid). In some scenarios, flavor additives are added that improve the taste of beer, such as fruit, syrup, and vanilla bean additives.

SUMMARY

Implementations disclosed herein provide a mobile terminal configured to provide recipe information for making a beverage using a beverage-making apparatus.

In one aspect, a mobile terminal includes a wireless communication unit configured to communicate with a beverage-making apparatus; a display unit; and at least one processor. The at least one processor is configured to: receive a first request for selecting a first ingredient included in a first ingredient category for making a beverage with the beverage-making apparatus; display at least one recommended second ingredient, among a plurality of second ingredients included in at least one second ingredient category, that is determined based on the selected first ingredient; receive a second request for selecting a second ingredient among the at least one recommended second ingredient that is displayed; and display, through the display unit, beverage recipe information related to a beverage-making recipe that includes the selected first ingredient and the selected second ingredient for making the beverage using the beverage-making apparatus.

In some implementations, the at least one processor is further configured to: acquire the beverage recipe information including the selected first ingredient and the selected second ingredient from at least one memory device of the mobile terminal or from at least one computer that is communicative to the mobile terminal.

In some implementations, the at least one second ingredient category includes a plurality of second ingredient categories other than the first ingredient category, and the at least one processor is further configured to display the at least one recommended second ingredient by: displaying a plurality of recommended second ingredients, each recommended second ingredient included in a respective second ingredient category among the plurality of second ingredient categories, and the plurality of recommended second ingredients that are displayed being determined based on the selected first ingredient.

In some implementations, the at least one processor is further configured to: display at least one recommended third ingredient among a plurality of third ingredients included in a third ingredient category, the at least one recommended third ingredient determined based on the selected first ingredient and the selected second ingredient; receive a request for selecting a third ingredient among the at least one recommended third ingredient that is displayed; display at least one recommended fourth ingredient among a plurality of fourth ingredients included in a fourth ingredient category, that is determined based on the selected first ingredient, the selected second ingredient, and the selected third ingredient; receive a request for selecting a fourth ingredient among the at least one recommended fourth ingredient that is displayed; and display, through the display unit, the beverage recipe information related to the beverage-making recipe that further includes the selected third ingredient and the selected fourth ingredient.

In some implementations, the first ingredient category is a wort category.

In some implementations, the second ingredient category, the third ingredient category, and the fourth ingredient category include a yeast category, a hop category, and a flavor additive category.

In some implementations, the at least one processor is further configured to: in response to a request for selecting the displayed beverage recipe information, display additional information regarding the selected beverage recipe information, and the additional information regarding the selected beverage recipe information includes at least one of information regarding ingredients included in the beverage-making recipe corresponding to the beverage recipe information, information regarding at least one characteristic of the beverage made by the beverage-making apparatus using the beverage-making recipe, or information regarding at least one user review of the beverage made by the beverage-making apparatus using the beverage-making recipe.

In another aspect, at least one non-transitory computer-readable recording medium is encoded with at least one computer program including instructions that, when executed, operate to cause a mobile terminal communicative with a beverage-making apparatus to perform operations that include: receiving a first request for selecting a first ingredient included in a first ingredient category among a plurality of ingredient categories for making a beverage with the beverage-making apparatus; displaying at least one recommended second ingredient, among a plurality of second ingredients included in at least one second ingredient category, that is determined based on the selected first ingredient; receiving a second request for selecting a second ingredient among the at least one recommended second ingredient that is displayed; and displaying, through a display unit of the mobile terminal, beverage recipe information related to a beverage-making recipe that includes the selected first ingredient and the selected second ingredient for making the beverage using the beverage-making apparatus.

In some implementations, the operations further include: acquiring the beverage recipe information including the selected first ingredient and the selected second ingredient from at least one memory device of the mobile terminal or from at least one computer that is communicative with the mobile terminal.

In some implementations, the at least one second ingredient category includes a plurality of second ingredient categories other than the first ingredient category among the plurality of ingredient categories, and displaying the at least one recommended second ingredient includes: displaying a plurality of recommended second ingredients, each recommended second ingredient included in a respective second ingredient category among the plurality of second ingredient categories, and the plurality of recommended second ingredients that are displayed being determined based on the selected first ingredient.

In some implementations, the operations further include: displaying at least one recommended third ingredient among a plurality of third ingredients included in a third ingredient category, the at least one recommended third ingredient matched to the selected first ingredient and the selected second ingredient; receiving a request for selecting a third ingredient among the at least one recommended third ingredient that is displayed; displaying at least one recommended fourth ingredient among a plurality of fourth ingredients included in a fourth ingredient category, the at least one recommended fourth ingredient matched to the selected first ingredient, the selected second ingredient, and the selected third ingredient; receiving a request for selecting a fourth ingredient among the at least one recommended fourth ingredient that is displayed; and displaying, through the display unit, the beverage recipe information related to the beverage-making recipe that further includes the selected third ingredient and the selected fourth ingredient.

In some implementations, the operations further include: in response to a request for selecting the displayed beverage recipe information, displaying additional information regarding the selected beverage recipe information. The additional information regarding the selected beverage recipe information includes at least one of information regarding ingredients included in the beverage-making recipe corresponding to the beverage recipe information, information regarding at least one characteristic of the beverage made by the beverage-making apparatus using the beverage-making recipe, or information regarding at least one user review of the beverage made by the beverage-making apparatus using the beverage-making recipe.

In another aspect, a mobile terminal includes: a wireless communication unit configured to communicate with a beverage-making apparatus; a display unit; and at least one processor. The at least one processor is configured to: receive a first request for selecting at least one ingredient among a plurality of ingredients for making a beverage with the beverage-making apparatus; acquire, from at least one memory device of the mobile terminal or from at least one computer communicative with the mobile terminal, and in response to the received first request, beverage recipe information that includes one or more ingredients from among the selected at least one ingredient; and display the acquired beverage recipe information through the display unit.

In some implementations, the at least one processor is further configured to: display, through the display unit, a tag selection interface that includes a plurality of tags respectively corresponding to the plurality of ingredients; receive the first request for selecting the at least one ingredient by receiving a request for selecting at least one tag among the plurality of tags, based on the displayed tag selection interface; and acquire the beverage recipe information by acquiring the beverage recipe information including the one or more ingredients from among the selected at least one ingredient corresponding to the selected at least one tag, in response to the received request.

In some implementations, the at least one processor is configured to: based on the beer recipe information including a plurality of beverage recipe information corresponding to a plurality of beverage-making recipes, display the plurality of beverage recipe information in an order based on a respective number of selected ingredients that are included in each beverage recipe information.

In some implementations, the at least one processor is further configured to display, on the display unit, an information interface regarding the acquired beverage recipe information. The information interface includes at least one of an image of the beverage made by the beverage-making apparatus using the beverage recipe information, information regarding at least one characteristic of the beverage made by the beverage-making apparatus using the beverage recipe information, or information regarding at least one user review of the beverage made by the beverage-making apparatus using the beverage recipe information.

In some implementations, the at least one processor is further configured to: receive a storage request to save at least one first ingredient among the plurality of ingredients for making the beverage; store, in a memory device and in response to the received storage request, information regarding the at least one first ingredient that was saved; display, through the display unit, a list of the at least one first ingredient that was saved; receive a recipe request for providing a beverage recipe based on the at least one first ingredient that was saved; acquire, in response to the recipe request, beverage recipe information including at least one of the at least one first ingredient that was saved; and display the acquired beverage recipe information through the display unit.

In some implementations, the at least one processor is configured to display, through the display unit, the information regarding the at least one first ingredient that was saved by: displaying a first subset of the at least one first ingredient that belongs to a first ingredient category; and displaying a second subset of the at least one first ingredient, visually distinguished from the first subset, that belongs to a second ingredient category.

In some implementations, the displayed beverage recipe information includes: a name of a beverage-making recipe corresponding to the beverage recipe information, information regarding ingredients corresponding to the beverage recipe information, and a selection menu of the ingredients corresponding to the beverage recipe information.

In some implementations, the at least one processor is further configured to: receive a selection request for ingredients included in the beverage recipe information, based on the displayed selection menu; and provide a selection interface for selecting, among the at least one first ingredient that was saved, the ingredients included in the beer recipe information, in response to the received selection request.

In some scenarios, selected implementations disclosed herein may provide one or more advantages as described below.

According to some implementations, when some beverage-making ingredients are selected by a user, the mobile terminal can ascertain and provide information on other ingredients suitable for the selected beverage-making ingredients. Accordingly, the mobile terminal can facilitate the user effectively acquiring beverage recipe information by selecting the other ingredients suitable for the selected ingredients.

Also, the mobile terminal can provide beverage-making recipes based on beverage-making ingredients desired by the user among a plurality of beverage-making ingredients, thereby providing a beverage recipe suitable for a taste of the user.

In some implementations, the mobile terminal enables the user to select other ingredients suitable for beverage-making ingredients selected by the user, and thus reduce the possibility that the quality of the beverage is deteriorated by inappropriate combinations of beverage-making ingredients. Accordingly, the utility of the beverage-making apparatus can be enhanced.

Further scope of applicability of the present disclosure will become apparent from the detailed description given hereinafter. However, it should be understood that the detailed description and specific examples are given by way of illustration only, and various changes and modifications within the spirit and scope of the disclosure may be made.

DETAILED DESCRIPTION

Implementations disclosed herein provide a mobile terminal configured to provide recipe information for making a beverage using a beverage-making apparatus. The mobile terminal may be communicative with the beverage-making apparatus and may, in some scenarios, provide recipe information for ingredients desired by a user among a plurality of beverage-making ingredients.

In some implementations, the mobile terminal may adaptively provide recommendations for beverage-making recipes or beverage-making ingredients based on previous ingredient selections made by a user, for making a beverage using the beverage-making apparatus. As such, the mobile terminal may facilitate beverage-making for a user that uses a beverage-making apparatus, by automatically recommending appropriate combinations of ingredients that result in a beverage product.

One example of a beverage-making apparatus is a beer-maker, which may be used in homes. Typically, house beer may include a total of three steps, i.e., a wort producing step, a fermenting step, and a ripening step, and two weeks to three weeks may be required from the wort producing step to the ripening step. In some scenarios, a beer maker can be configured to conveniently regulate a temperature for beer fermentation.

Producing a beverage using a beverage-making apparatus may be subject to high variability depending on the combination of ingredients used. For example, a recipe of beer brewed using a beer maker can be highly varied according to combinations of beer ingredients. In addition, the taste of beer may vary according to combinations of beer ingredients. Accordingly, when beer is brewed using a beer maker, a user needs to conveniently acquire information on suitable combinations of beer ingredients.

Hereinafter, examples of some implementations of the present disclosure will be described in detail with reference to the accompanying drawings.

Some of the examples below describe a scenario in which the beverage-making apparatus is specifically a beer-making apparatus. However, implementations are not limited thereto, and may be implemented as any suitable beverage making apparatus that utilizes fermentation.

Figure 1:
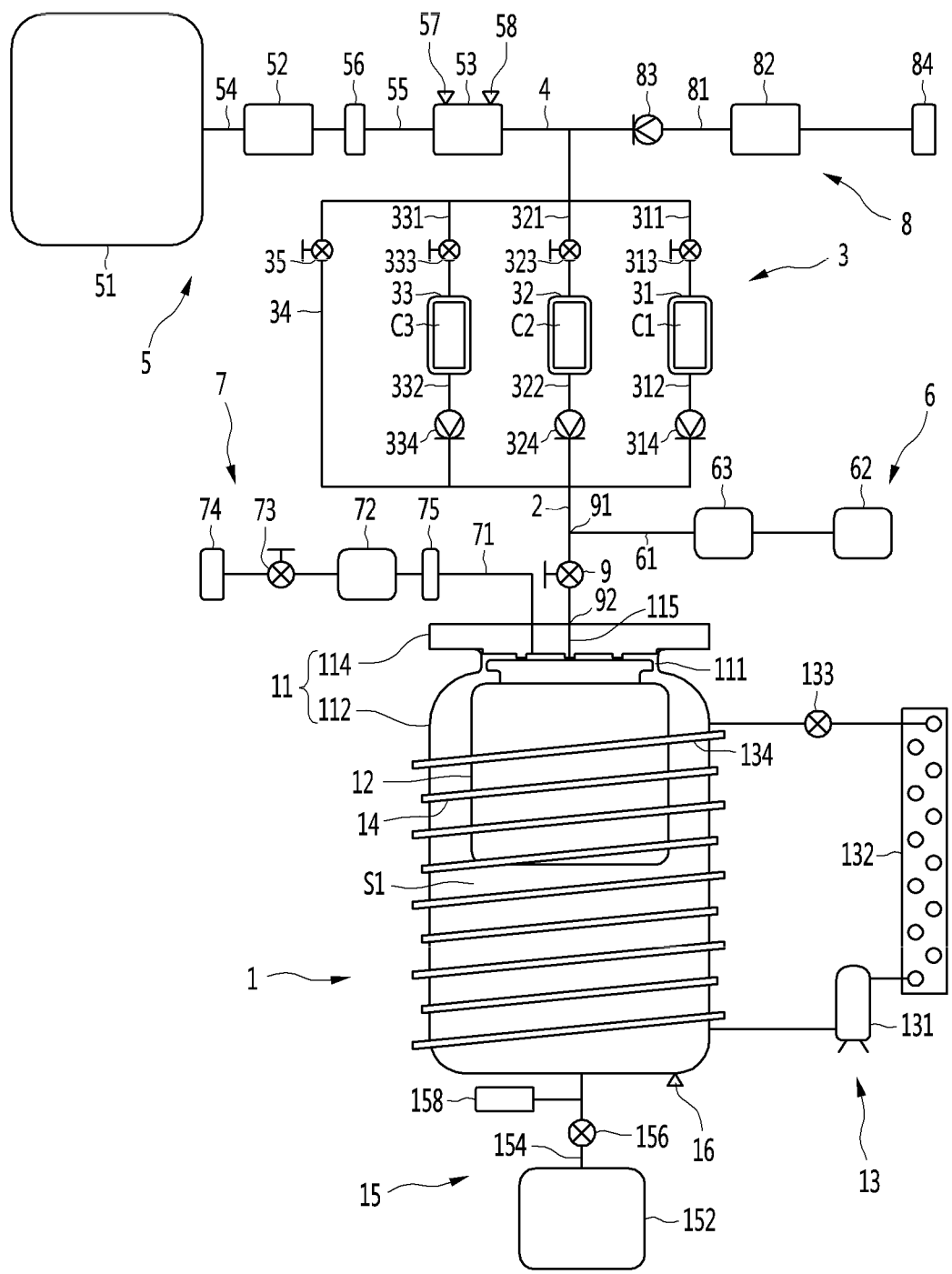
FIG. 1 is a diagram illustrating an example of an entire configuration view of a beverage-making apparatus according to some implementations.

FIG. 1 is an entire configuration view of a beverage maker according to an implementation.

The beverage making apparatus, as shown in FIG. 1, may include a fermentation module 1, an ingredient supplier 3 (or simply, supplier 3) connected to the fermentation module 1 through a main channel 2 (also referred to as main flow path 2), a water supply module 5 connected to the supplier 3 through a water supply channel 4 (also referred to as water supply flow path 4), and a beverage extractor 6 that allows a beverage fermented in the fermentation module 1 to be extracted to the outside.

The fermentation module 1 includes a container, for example fermentation tank assembly 11, having a space S1 formed therein. The container may include a container body, such as fermentation tank 112, and a container cover, such as fermentation tank cover 114.

In the example of FIG. 1, the fermentation tank assembly 11 includes a fermentation tank 112 has an opening 111 formed at an upper portion thereof, the fermentation tank 112 having the space S1 formed therein, and a fermentation tank cover 114 covering the opening 111.

The fermentation tank 112 may be configured as an assembly of a plurality of members.

The fermentation tank cover 114 is used to seal the inside of the fermentation tank 112, and may be disposed at an upper portion of the fermentation tank 112 to cover the opening 111. A main flow path connecting part 115 connected to the main flow path 2 may be formed in the fermentation tank cover 114.

In addition, the fermentation module 1 may further include a removable beverage ingredient pack 12 that holds at least some of the ingredients for making the beverage. As shown in the example of FIG. 1, the beverage ingredient pack 12 may be a beverage ingredient pack that is inserted and accommodated in the fermentation tank assembly 11.

In this example, the beverage ingredient pack 12 may be a pack in which ingredients for making a beverage are accommodated. The following description will focus on the scenario of a beverage brewing pack 12 as the beverage ingredient pack, although implementations may be applied to any suitable beverage ingredient pack utilized for fermentation.

The beverage brewing pack 12 may be formed smaller than the space S1 formed in the fermentation tank assembly 11. The beverage brewing pack 12 may be inserted and accommodated in the fermentation tank assembly 11 in a state in which the ingredients are accommodated therein. The beverage brewing pack 12 may be inserted into the fermentation tank 112 to be accommodated in the fermentation tank 112 in a state in which the opening 111 of the fermentation tank 112 is opened. The fermentation tank cover 114 may cover the opening 111 of the fermentation tank 112 after the beverage brewing pack 12 is inserted into the fermentation tank 112. The beverage brewing pack 12 may assist the ingredients to be fermented in a state in which the beverage brewing pack 12 is accommodated in the space S1 sealed by the fermentation tank 112 and the fermentation tank cover 114. The beverage brewing pack 12 may be expanded by a pressure therein while the beverage is being brewed.

As an example, in the case where the beverage is beer, the ingredients for brewing the beer may include water, malt, yeast, hops, flavor additives, and the like.

The beverage maker may include both of the supplier 3 and the beverage ingredient pack 12, and the ingredients for brewing the beverage may be distributed and accommodated in the supplier 3 and the beverage ingredient pack 12. Some ingredients among the ingredients for brewing the beverage may be accommodated in the beverage ingredient pack 12, and the other ingredients may be accommodated in the supplier 3. The other ingredients accommodated in the supplier 3 may be supplied to the beverage ingredient pack 12 together with water supplied from the water supply module 5, and be mixed with the ingredients accommodated in the beverage ingredient pack 12.

A main ingredient essential to brew the beverage may be accommodated in the beverage ingredient pack 12, and additives added to the main ingredient may be accommodated in the supplier 3. In this case, the additives accommodated in the supplier 3 may be mixed with the water supplied from the water supply module 5 to be supplied to the beverage ingredient pack 12, and be mixed with the main ingredient accommodated in the beverage ingredient pack 12.

The main ingredient accommodated in the beverage ingredient pack 12 is an ingredient having a larger volume than the other ingredients, and may be, in the case of beer, the malt among the malt, the yeast, the hops, and the flavor additives. In addition, the additives accommodated in the supplier 3 may be the other ingredients except the malt among the ingredient for brewing the beer, and be the yeast, the hops, the flavor additives, and the like.

Meanwhile, the beverage maker does not include both of the beverage ingredient pack 12 and the supplier 3 as described above, but may include only the supplier 3 without any separate beverage ingredient pack 12. All of the ingredients for brewing the beverage may be accommodated in the supplier 3. In this case, all of the ingredients accommodated in the supplier 3 may be supplied to the inside of the fermentation tank assembly 11 together with the water supplied from the water supply module 5. The main ingredient and the additives may be accommodated together in the supplier 3. The main ingredient and additives, which are accommodated in the supplier 3, may be simultaneously supplied to the inside of the fermentation tank assembly 11 or be sequentially supplied with a time difference.

In addition, the beverage maker does not include any separate beverage ingredient pack 12, but may directly inject some ingredients among the ingredients for brewing the beverage into the fermentation tank assembly 11 and allow the other ingredients for brewing the beverage to be accommodated in the supplier 3. In this case, a user may directly inject the main ingredient into the fermentation tank assembly 11, and the additives may be accommodated in the supplier 3. The additives accommodated in the supplier 3 may be mixed with the water supplied from the water supply module 5, and be mixed with the main ingredient previously injected into the fermentation tank assembly 11.

In addition, the beverage maker does not include the supplier 3, but may include the beverage ingredient pack 12. In this case, the main ingredient may be accommodated in the beverage ingredient pack 12, and the user may directly inject the additives into the beverage ingredient pack 12.

In addition, the beverage maker does not include both of the supplier 3 and the beverage ingredient pack 12, but the user may directly inject the main ingredient and the additives simultaneously or with a time difference into the fermentation tank assembly 11.

When the beverage maker includes both of the supplier 3 and the beverage ingredient pack 12, the beverage can be more conveniently brewed. Hereinafter, the case where the beverage maker includes both of the supplier 3 and the beverage ingredient pack 12 is described as an example. However, it will be apparent that the present disclosure is not limited to the case where the beverage maker includes both of the supplier 3 and the beverage ingredient pack 12.

The ingredients injected into the beverage ingredient pack 12 may be fermented as time elapses. The beverage that has been completely brewed in the beverage ingredient pack 12 may flow in the main flow path 2 through the main flow path connecting part 115, and flow from the main flow path 2 to the beverage extractor 6 to be extracted from the beverage extractor 6.

The fermentation module 1 may further include a temperature controller that changes a temperature of the fermentation tank assembly 11. As the temperature controller heats or cools the fermentation tank assembly 11, the temperature of the fermentation tank assembly 11 can be controlled to an optimum temperature for brewing the beverage.

The temperature controller may include a refrigeration cycle apparatus 13 including a compressor 131, a condenser 132, an expansion device 133, and an evaporator 134, and any one of the condenser 132 and the evaporator 134 may be disposed at the fermentation tank assembly 11.

When the condenser 132 is disposed in contact with the fermentation tank 112, the refrigeration cycle apparatus 13 may control a temperature of the fermentation tank 112 by heating the fermentation tank 112. In this case, the condenser 132 may be disposed in contact with the outer surface of the fermentation tank 112. The condenser 132 may include a condensing tube wound around the outer surface of the fermentation tank 112.

When the evaporator 134 is disposed in contact with the fermentation tank 112, the refrigeration cycle apparatus 13 may control the temperature of the fermentation tank 112 by cooling the fermentation tank 112. In this case, the evaporator 134 may be disposed in contact with the outer surface of the fermentation tank 112. The evaporator 134 may include an evaporating tube wound around the outer surface of the fermentation tank 112. The evaporating tube may be accommodated between the fermentation tank 112 and a heat insulating wall 102 (see FIGS. 3 and 4), and cool the inside of a heat insulating space S2 heat-insulated by the heat insulating wall 102.

The temperature controller may further include a heater 14 that heats the fermentation tank assembly 11. The heater 14 may be disposed in contact with the outer surface of the fermentation tank 112, and be configured as a heater that generates heat when power is applied thereto. The heater 14 may be configured as a line heater, and be wound around the outer surface of the fermentation tank 112.

The refrigeration cycle apparatus 13 may be configured as a heat pump. The refrigeration cycle apparatus 13 may include a flow path switching valve. The flow path switching valve may be configured as a four-way valve. The flow path switching valve may be connected to each of an inlet flow path of the compressor 131 and an outlet flow path of the compressor 131. The flow path switching valve may be connected to the condenser 132 through a condenser connection flow path, and be connected to the evaporator 134 through an evaporator connection flow path.

When the fermentation tank 112 is cooled, the flow path switching valve may guide a refrigerant compressed by the compressor 131 to the condenser 132 and guide the refrigerant discharged from the evaporator 134 to the compressor 131.

When the fermentation tank 112 is heated, the flow path switching valve may guide the refrigerant compressed by the compressor 131 to the evaporator 134 and guide the refrigerant discharged from the condenser 132 to the compressor 131.

The beverage maker may include a beverage extraction pressurizing device 15 that injects air between the beverage ingredient pack 12 and the fermentation tank assembly 11. In a state in which the beverage ingredient pack 12 is accommodated in the fermentation tank assembly 11, the beverage extraction pressurizing device 15 may inject air between the beverage ingredient pack 12 and the fermentation tank assembly 11, and the air injected into the fermentation tank assembly 11 may pressurize the beverage ingredient pack 12. The beverage in the beverage ingredient pack 12 may be pressurized by the air, and flow in the main flow path 2 by passing through the main flow path connecting part 115. The beverage flowing in the main flow path 2 from the beverage ingredient pack 12 may be extracted to the outside through the beverage extractor 6.

That is, in the beverage maker, if the beverage is completely brewed, the beverage in the beverage ingredient pack 12 may be extracted through the beverage extractor 6 in a state in which the beverage ingredient pack 12 is not taken out of the fermentation tank assembly 11 but located in the fermentation tank assembly 11.

The beverage extraction pressurizing device 15 may include an air pump 152 that pumps air and an air supply flow path 154 that connects the air pump 152 and the inside of the fermentation tank assembly 11. The beverage extraction pressurizing device 15 may further include an air control valve 156 installed in the air supply flow path 154. The beverage extraction pressurizing device 15 may further include an air relief valve 158 provided to the air supply flow path 154. The air relief valve 158 may be installed posterior to the air control valve 156 in an air supply direction in the air supply flow path 154.

The air control valve 156 may be opened only when the beverage is extracted to allow air to be introduced into the fermentation tank assembly 11, and maintain a closed state while the beverage is not being extracted.

The beverage maker may further include a temperature sensor 16 that measures a temperature of the fermentation tank assembly 11. The temperature sensor 16 may be installed to measure a temperature of the fermentation tank 112.

Hereinafter, the supplier 3 will be described as follows.

The supplier 3 may be connected to a water supply heater 53 through the water supply flow path 4, and be connected to the fermentation tank assembly 11 through the main flow path 2.

The supplier 3 may accommodate ingredients required to brew the beverage therein, and be configured to allow water supplied from the water supply module 5 to pass therethrough. For example, in the case of beer, the ingredients accommodated in the supplier 3 may be yeast, hops, flavor additives, and the like.

The ingredients accommodated in the supplier 3 may be directly accommodated in an ingredient accommodation part formed in the supplier 3. At least one ingredient accommodation part may be formed in the supplier 3. A plurality of ingredient accommodation parts may be formed in the supplier 3. In this case, the plurality of ingredient accommodation parts may be formed to be divided from one another.

Meanwhile, the ingredients accommodated in the supplier 3 may be accommodated in a capsule, and at least one capsule accommodation part in which the capsule is accommodated may be formed in the supplier 3. When the ingredients are accommodated in the capsule, the supplier 3 may be configured such that the capsule is mountable and extractable. The supplier 3 may be configured as a capsule kit assembly in which the capsule is separably accommodated.

Each of the main flow path 2 and the water supply flow path 4 may be connected to the supplier 3. The water supplied through the water supply flow path 4 may be mixed with the ingredients by passing through the ingredient accommodation part or the capsule. The ingredients accommodated in the ingredient accommodation part or the capsule may flow in the main flow path 2 together with the water.

A plurality of different kinds of additives may be separated from one another to be accommodated in the supplier 3. The plurality of additives accommodated in the supplier 3 may be yeast, hops, and flavor additives, and be separated from one another to be accommodated in the supplier 3.

When a plurality of ingredient accommodation parts are formed in the supplier 3, each of the plurality of ingredient accommodation parts may be connected to the water supply flow path through a supplier entrance flow path, and be connected to the main flow path 2 through a supplier exit flow path.

When a plurality of capsule accommodation parts are formed in the supplier 3, each of the plurality of capsule accommodation parts may be connected to the water supply flow path 4 through the supplier entrance flow path, and be connected to the main flow path 2 through the supplier exit flow path.

The ingredient accommodation part of the supplier 3 and the capsule accommodation part of the supplier 3 may be the substantially same component. When the capsule is inserted into the supplier 3 in a state in which the ingredients are accommodated in the capsule, the component may be referred to as the capsule accommodation part. When the ingredients are directly accommodated in the supplier 3 in a state in which the ingredients are not contained in the capsule, the component may be referred to as the ingredient accommodation part. Since the ingredient accommodation part and the capsule accommodation part may be the substantially same component, it will be described below that, for convenience of description, the capsule accommodation part is formed in the supplier 3.

The capsule accommodation part in which a capsule containing additives is attachably/detachably accommodated may be formed in the supplier 3. The supplier 3 may be connected to the water supply flow path 4 through the supplier entrance flow path, and be connected to the main flow path 2 through the supplier exit flow path.

An opening/closing valve that opens/closes the supplier entrance flow path may be installed in the supplier entrance flow path.

A check valve that blocks a fluid of the main flow path 2 from flowing backward to the capsule accommodation part may be installed in the supplier exit flow path.

A plurality of capsule accommodation parts 31, 32, and 33 may be formed in the supplier 3. The plurality of capsule accommodation parts 31, 32, and 33 may be formed to be divided from one another. The plurality of capsule accommodation parts 31, 32, and 33 may be connected to supplier entrance flow paths and supplier exit flow paths, respectively.

Hereinafter, a first additive, a second additive, and a third additive may be accommodated in the supplier 3. The first additive may be yeast, the second additive may be hop, and the third additive may be a flavor additive.

The supplier 3 may include a first capsule accommodation part 31 in which a first capsule C1 containing the first additive is accommodated, a second capsule accommodation part 32 in which a second capsule C2 containing the second additive is accommodated, and a third capsule accommodation part 33 in which a third capsule C3 containing the third additive is accommodated.

A first supplier entrance flow path 311 that guides water or air to the first capsule accommodation part 31 may be connected to the first capsule accommodation part 31, and a first supplier exit flow path 312 through which water discharged from the first capsule accommodation part 31, a mixture of the water and the first additive, and air are guided may be connected to the first capsule accommodation part 31. A first opening/closing valve 313 that opens/closes the first supplier entrance flow path 311 may be installed in the first supplier entrance flow path 311. A first check valve 314 that blocks the fluid of the main flow path 2 from flowing backward to the first capsule accommodation part 31 while allowing a fluid of the first capsule accommodation part 31 to flow in the main flow path 2 may be installed in the first supplier exit flow path 312. Here, the fluid may include the water discharged from the first capsule accommodation part 31, the mixture of the water and the first additive, and the air.

A second supplier entrance flow path 321 that guides water or air to the second capsule accommodation part 32 may be connected to the second capsule accommodation part 32, and a second supplier exit flow path 322 through which water discharged from the second capsule accommodation part 32, a mixture of the water and the second additive, and air are guided may be connected to the second capsule accommodation part 32. A second opening/closing valve 323 that opens/closes the second supplier entrance flow path 321 may be installed in the second supplier entrance flow path 321. A second check valve 324 that blocks the fluid of the main flow path 2 from flowing backward to the second capsule accommodation part 32 while allowing a fluid of the second capsule accommodation part 32 to flow in the main flow path 2 may be installed in the second supplier exit flow path 322. Here, the fluid may include the water discharged from the second capsule accommodation part 32, the mixture of the water and the second additive, and the air.

A third supplier entrance flow path 331 that guides water or air to the third capsule accommodation part 33 may be connected to the third capsule accommodation part 33, and a third supplier exit flow path 332 through which water discharged from the third capsule accommodation part 33, a mixture of the water and the third additive, and air are guided may be connected to the third capsule accommodation part 33. A third opening/closing valve 323 that opens/closes the third supplier entrance flow path 331 may be installed in the third supplier entrance flow path 331. A third check valve 334 that blocks the fluid of the main flow path 2 from flowing backward to the third capsule accommodation part 33 while allowing a fluid of the third capsule accommodation part 33 to flow in the main flow path 2 may be installed in the third supplier exit flow path 332. Here, the fluid may include the water discharged from the third capsule accommodation part 33, the mixture of the water and the third additive, and the air.

The beverage maker may include a bypass flow path 34 that enables the water supplied from the water flow path 4 to be supplied to the main flow path 2 by bypassing the capsule accommodation parts 31, 32, and 33.

The bypass flow path 34 may be connected to the water supply flow path 4 and the main flow path 2, and water or air of the water flow path 4 may be guided to the bypass flow path 34 to flow in the main flow path 2 by bypassing the capsule accommodation parts 31, 32, and 33.

The bypass flow path 34 may be connected in parallel to flow paths of the first capsule accommodation part 31, the second capsule accommodation part 32, and the third capsule accommodation part 33.

A bypass valve 35 that opens/closes the bypass flow path 34 may be installed in the bypass flow path 34.

The beverage maker may include a main supply flow path that guides the water, the ingredients of the beverage, or the air to the fermentation tank assembly 11 therethrough.

When the beverage maker includes both of the supplier 3 and the water supply module 5, the main supply flow path may include all of the main flow path 2, the bypass flow path 34, and the water supply flow path 4. In this case, the main supply flow path may supply all of the water, the air, and the ingredients of the beverage to the fermentation tank assembly 11.

The beverage maker includes the supplier 3, but may not include the water supply module 5. In this case, the main supply flow path may include all of the main flow path 2, the bypass flow path 34, and the water supply flow path 4. The water supply flow path 4 may be directly connected to a water faucet or include a water supply tube that is connected to the water faucet through a separate connection hose to be supplied with external water. The water supply tube may be supplied with external water to supply the external water to the bypass flow path 34 or the supplier 3. That is, the main supply flow path may supply all of the water, the air, and the ingredients of the beverage to the fermentation tank assembly 11 therethrough.

The beverage maker includes the water supply module 5, but may not include the supplier 3. In this case, the main supply flow path may include the main flow path 2, and the main flow path 2 may be directly connected to the water supply module 5. In addition, an air injection flow path 81 of an air injector 8 may be connected to the main flow path 2.

When the beverage maker includes the water supply module 5 but does not include the supplier 3, the main supply flow path does not require a separate water supply flow path 4 or bypass flow path 34 that connects the water supply module 5 and the supplier 3, and the main flow path 2 may be directly supplied from the water supply module 5. In addition, the air injection flow path 81 of the air injector 8 may be connected to a portion located between the water supply module 5 and a main valve 9 in the main flow path 2.

When the beverage maker includes the water supply module 5 but does not include the supplier 3, water of the water supply module 5 may be supplied to the fermentation tank assembly 11 through the main flow path 2, and air of the air injector 8 may be supplied to the fermentation tank assembly 11 through the main flow path 2. That is, the main flow path may supply water and air to the fermentation tank assembly 11.

The beverage maker may not include both of the supplier 3 and the water supply module 5. In this case, the main supply flow path may include the main flow path 2, and the main flow path 2 may be directly connected to a water faucet or include a water supply tube that is connected to the water faucet through a separate connection hose to be supplied with external water. The water supply tube may be supplied with external water to supply the external water to the fermentation tank assembly 11.

When the beverage maker does not include both of the supplier 3 and the water supply module 5, the main supply flow path does not require a separate water supply flow path 4 or bypass flow path 34 that connects the water supply module 5 and the supplier 3, and the main flow path 2 may be directly supplied from the water supply module 5. In this case, the air injection flow path 81 of the air injector 8 may be connected to the main flow path 2, and be connected prior to the main valve 9 in the main flow path 2. That is, the main supply flow path may supply water and air to the fermentation tank assembly 11.

Hereinafter, the case where the beverage maker includes all of the main flow path 2, the water supply flow path 4, and the bypass flow path 34 will be described as an example.

The main flow path 2 may be connected to the first supplier exit flow path 312, the second supplier exit flow path 322, the third supplier exit flow path 332, and the bypass flow path 34. The main flow path 2 may include a common tube connected to the fermentation tank assembly 11 and a combination tube connected to the first supplier exit flow path 312, the second supplier exit flow path 322, the third supplier exit flow path 332, the bypass flow path 34 and the common tube.

The main flow path 2 may be connected to the fermentation tank assembly 11, and be connected to the fermentation tank cover 114 in the fermentation tank assembly 11.

The water supply flow path 4 may be connected to the first supplier entrance flow path 311, the second supplier entrance flow path 321, the third supplier entrance flow path 331, and the bypass flow path 34.

The water supply flow path 4 may include a common tube connected to the water supply module 5, and a plurality of branch tubes branching off from the common tube, the plurality of branch tubes being connected to the first supplier entrance flow path 311, the second supplier entrance flow path 321, the third supplier entrance flow path 331, and the bypass flow path 34.

The water supply module 5 may include a water tank containing water, a water supply pump 52 that pumps the water of the water tank 51, and the water supply heater 53 that heats the water pumped by the water supply pump 52.

A water tank outlet flow path 54 may be connected to the water tank 51, and the water supply pump 52 may be connected to the water tank outlet flow path 54.

A water supply pump outlet flow path 55 may be connected to the water supply pump 52, and the water supply heater 53 may be connected to the water supply pump outlet flow path 55.

A flow meter 56 that measures a flow rate of the water supply pump outlet flow path 55 may be installed in the water supply pump outlet flow path 55.

The water supply heater 53 may be a mold heater, and include a heater case through which the water pumped by the water supply pump 52 passes, and a heater installed in the heater case to heat water introduced into the heater case. A thermistor 57 that measures a temperature of the water supply heater 53 may be installed in the water supply heater 53. In addition, a thermal fuse 58 that cuts off current applied to the water supply heater 53 as a circuit is interrupted when the temperature of the water supply heater 53 is high.

When the water supply pump 52 is driven, water of the water tank 51 may be guided to the water supply heater 53 through the water tank outlet flow path 54, the water supply pump 52, and the water supply pump outlet flow path 55. The water guided to the water heater 53 may be heated by the water supply heater 53 and then guided to the water supply flow path 4.

The beverage extractor 6 may be connected to the main flow path 2. The beverage extractor 6 may include a beverage extraction flow path 61 connected to the main flow path 2, the beverage extraction flow path 61 allowing the beverage of the main flow path 2 to be guided therethrough. The beverage extractor 6 may further include a beverage extraction valve 62 connected to the beverage extraction flow path 61.

An anti-foaming path 63 may be provided in the beverage extraction flow path 61, and foam of the beverage flowing from the main flow path 2 to the beverage extraction flow path 61 may be minimized by passing through the anti-foaming path 63. A mesh, etc., through which foam is filtered, may be provided in the anti-foaming path 63.

The beverage extraction valve 62 may include a lever manipulated by the user and a tap valve having a micro switch that detects a manipulation of the user.

Meanwhile, the beverage maker may further include a gas discharger that discharges gas in the fermentation module 1 to the outside.

The gas discharger 7 may include a gas extraction flow path 71 connected to the fermentation module 1 and a pressure sensor 72 installed in the gas extraction flow path 71. The gas discharger 7 may further include a gas extraction valve 73 that opens/closes the gas extraction flow path 71. The gas discharger 7 may further include an air filter 74 through which gas passing through the gas extraction valve 73 passes.

The gas extraction flow path 71 may be connected to the fermentation tank assembly 11, particularly, the fermentation tank cover 114.

The gas extraction valve 73 may be turned on when air is injected into the beverage ingredient pack 12, to be opened. The beverage maker may allow malt and water to be uniformly mixed together by injecting air into the beverage ingredient pack 12. As such, in the case of beer making, bubbles generated from the liquid malt may be discharged to the outside at an upper portion of the beer brewing pack 12 through the gas extraction flow path 71 and the gas extraction valve 73.

The gas extraction valve 73 may be opened to detect a fermentation degree during a fermentation process. The gas in the beverage brewing pack 12 may flow in the pressure sensor 72. The pressure sensor 72 may sense a pressure of the gas discharged from the beverage brewing pack 12.

The pressure sensor 72, the gas extraction valve 73, and the air filter 74 may be sequentially disposed in a gas discharge direction in the gas extraction flow path 71.

The gas discharger 7 may further include a gas discharge relief valve 75 provided in the gas extraction flow path 71. The gas discharge relief valve 75 may be installed prior to the pressure sensor 72 in the gas discharge direction.

The beverage maker may further include the air injector 8 connected to at least one of the main flow path 2 and the water supply flow path 4 to inject air.

When the air injector 8 is connected to the water supply flow path 4, air may be injected into the supplier 3 through the water supply flow path 4. The air injected into the water supply flow path 4 may sequentially pass through the supplier 3 and the main flow path 2 and then be injected into the beverage brewing pack 12. When the air injector 8 is connected to the water supply flow path 4, air may be injected into the beverage brewing pack 12 through the water supply flow path 4, the bypass flow path 34, and the main flow path 2. The air injector 8 may supply the air to the ingredients in the beverage brewing pack 12.

When the air injector 8 is connected to the water supply flow path 4, air may be injected into the capsule accommodation parts 31, 32, and 33 through the water supply flow path 4, remaining water or sludge in the capsules C1, C2, and C3 and the capsule accommodation parts 31, 32, and 32 may flow in the main flow path 2, and the capsules C1, C2, and C3 and the capsule accommodation parts 31, 32, and 32 may be cleanly maintained.

The air injector 8 may include the air injection flow path 81 connected to the water supply flow path 4 and an air injection pump 82 that pumps air to the air injection flow path 81.

The air injector 8 may further include a check valve 83 that blocks the water of the water supply flow path 4 from being introduced into the air injection pump 82 through the air injection flow path 81. The check valve 83 may be installed posterior to the air injection pump 82 in an air injection direction.

The air injector 8 may further include an air filter 84 connected to the air injection flow path 81, the air filter 84 being installed prior to the air injection pump 82 in the air injection direction.

When the air injection pump 82 is driven, dust, etc. in air may be filtered by the air filter 84, and the air passing through the air filter 84 may be flowed by the air injection pump 82 to flow in the water supply flow path 4.

The beverage maker may further include the main valve 9 that opens/closes the main flow path 2.

The main valve 9 may be installed, in the main flow path 2, between a connection part 91 of the main flow path 2 and the beverage extraction flow path 61 and a connection part 92 of the main flow path 2 and the fermentation tank assembly 11.

The main valve 9 may opened when hot water is injected into the beverage ingredient pack 12, to open the main flow path 2. The main valve 9 may be closed while the fermentation tank assembly 11 is cooled, to close the main flow path 2. The main valve 9 may be opened when air is injected into the beverage ingredient pack 12, to open the main flow path 2. The main valve 9 may be opened when an additive is supplied to the inside of the beverage ingredient pack 12, to open the main flow path 2. The main valve 9 may be closed while ingredients are being fermented, to close the inside of the beverage ingredient pack 12. The main valve 9 may be closed when the beverage is ripened and kept, to close the inside of the beverage ingredient pack 12. The main valve 9 may be opened when the beverage is extracted from the beverage extractor 6, to open the main flow path 2.

Figure 2:
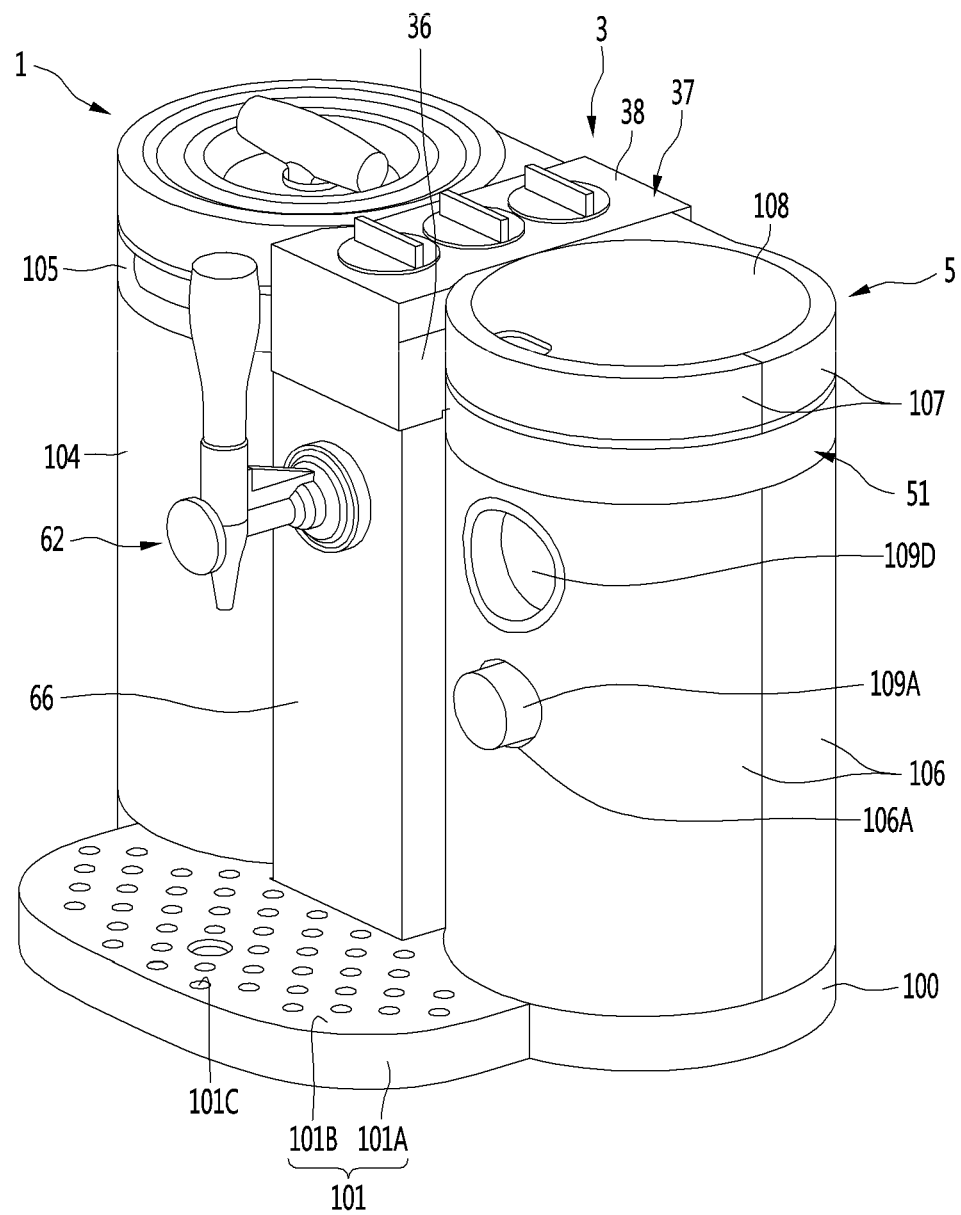
FIG. 2 is a diagram illustrating an example of a perspective view of the beverage-making apparatus according to some implementations.
Figure 3:
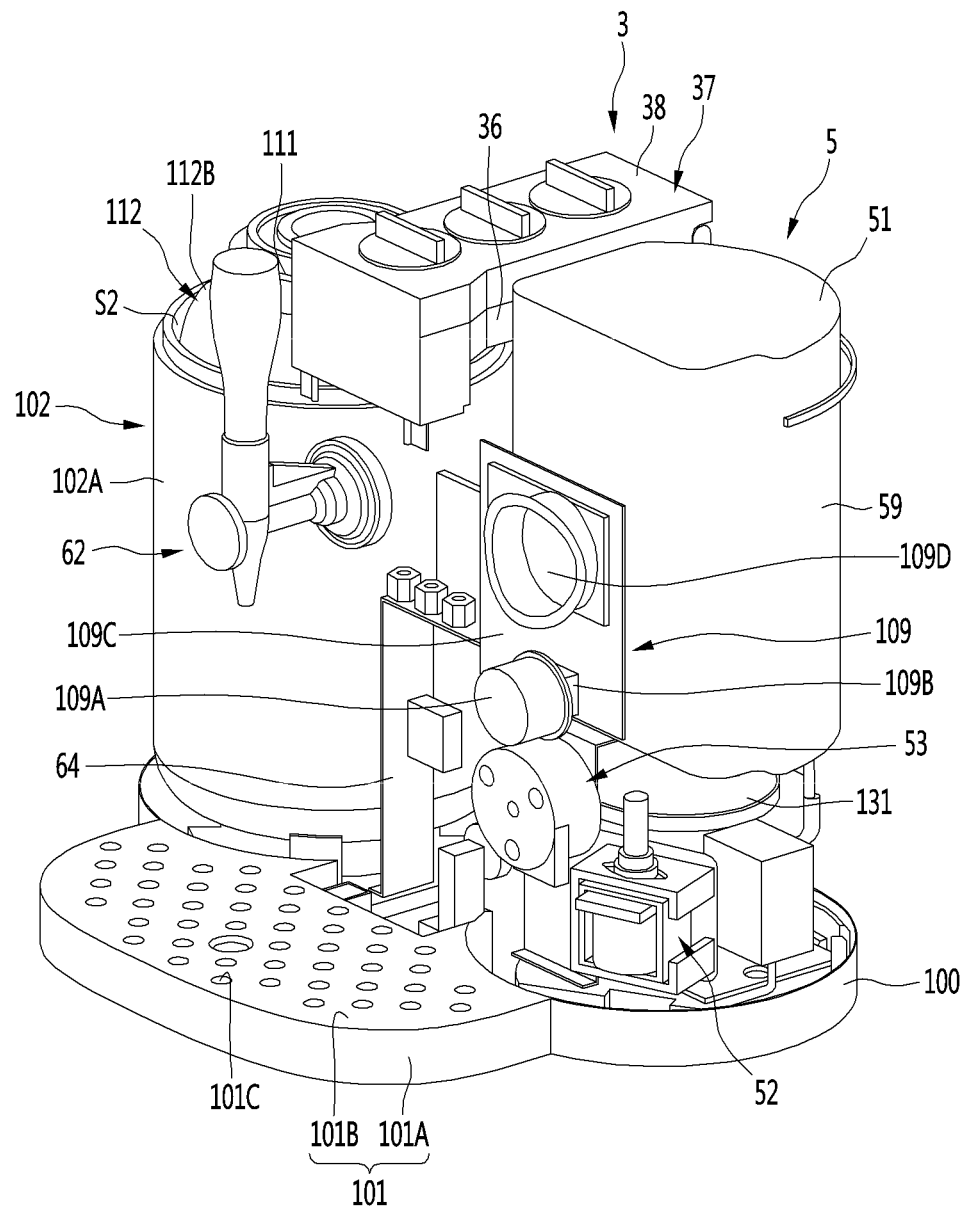
FIG. 3 is a diagram illustrating an example of a perspective view illustrating an inside of a beverage-making apparatus according to some implementations.
Figure 4:
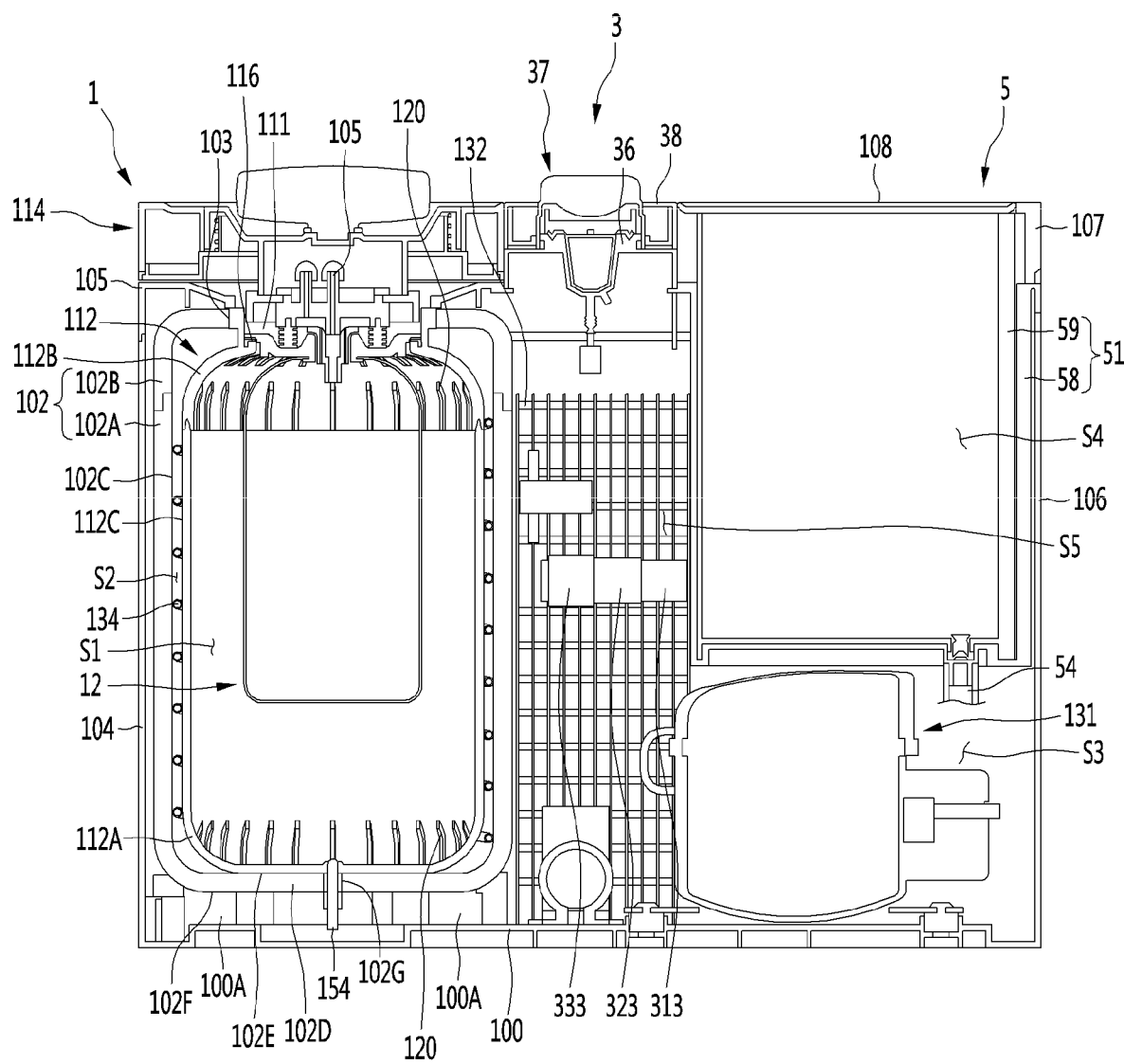
FIG. 4 is a diagram illustrating an example of a front view illustrating an inside of a beverage-making apparatus according to some implementations.

FIG. 2 is a perspective view of the beverage maker according to some implementations. FIG. 3 is a perspective view illustrating an inside of the beverage maker according to some implementations. FIG. 4 is a front view illustrating an inside of the beverage maker according to some implementations.

The beverage maker may further include a base 100. The base 100 may form a bottom appearance of the beverage maker, and support the fermentation tank assembly 11, the compressor 131, the water supply heater 53, the water supply pump 52, the water tank 51, and the like, which are located at the top side thereof.

The beverage maker may further include a beverage container 101 configured to receive and keep beverage dropping from the beverage extraction valve 62. The beverage container 101 may be integrally formed with the base 100 or be coupled to the base 100.

The beverage container 101 may include a container body 101A having a space in which the beverage dropping from the beverage extraction valve 62 is accommodated. The beverage container 101 may include a container top plate 101B disposed at the top surface of the container body 101A to cover the space in the container body 101A.

The container body 101A may be formed to protrude forward at a front portion of the base 100. The top surface of the container body 101A may be opened.

Holes 101C through which the beverage drops into the container body 101A may be formed in the container top plate 101B.

Beverage dropping around a beverage container in the beverage dropping from the beverage extraction valve 62 may drop to the container top plate 101B, and be temporarily kept inside the beverage container 101 through the holes 101C of the container top plate 101B. Thus, surroundings of the beverage maker can be cleanly maintained.

The fermentation tank 112, as shown in FIG. 4, may include a lower fermentation tank 112A of which top surface is opened, the lower fermentation tank 112A having a space formed therein, and an upper fermentation tank 112B disposed at the top of the lower fermentation tank 112A, the upper fermentation tank 112B having the opening 111 formed in the top surface thereof.

A seat part 116 on which the beverage ingredient pack 12 is mounted may be provided in the fermentation tank 112. The seat part 116 may be provided to protrude from the opening 111, and a circumferential part of the beverage ingredient pack 12 may be mounted on the seat part 116.

The beverage maker may include the heat insulating wall 102 surrounding both of the fermentation tank 112 and the evaporator 134.

The heat insulating wall 102 may be formed of polystyrene foam or the like, which has high heat insulation performance and can absorb vibration.

A heat insulating wall opening 103 may be formed at an upper portion of the heat insulating wall 102, and the heat insulating space S2 may be formed inside the heat insulating wall 102.

The heat insulating wall 102 may be configured as an assembly of a plurality of members. The heat insulating wall 102 may include a lower heat insulating wall 102A of which top surface is opened, the lower heat insulating wall 102A having a space formed therein, and an upper heat insulating wall 102B disposed at the top of the lower heat insulating wall 102A, the upper heat insulating wall 102B having the heat insulating wall opening 103 formed in the top surface thereof.

The heat insulating wall 102 having the lower heat insulating wall 102A and the upper heat insulating wall 102B may surround the circumferential and bottom surfaces of the fermentation tank 112.

The heat insulating wall opening 103 of the heat insulating wall 102 may surround an upper portion of the fermentation tank 112. The heat insulating wall opening 103 of the heat insulating wall 102 may surround the outer surface of a portion at which the heat insulating wall opening 103 is formed in the fermentation tank 112.

An inner surface 102C of the heat insulating wall 102 may have a larger diameter than an outer surface 112C of the fermentation tank 112, and a gap may be formed between the inner surface 102C of the heat insulating wall 102 and the outer surface 112C of the fermentation tank 112. Air may be filled in the gap, and the air between the inner surface 102C of the heat insulating wall 102 and the outer surface 112C of the fermentation tank 112 may heat-insulate the fermentation tank 112. The gap between the inner surface 102C of the heat insulating wall 102 and the outer surface 112C of the fermentation tank 112 may be a space in which the evaporator 134 is accommodated, and simultaneously be a space that can minimize a change in temperature of the fermentation tank 112.

The fermentation tank 112 may be mounted on a top surface 102E of a bottom plate part 102D of the heat insulating wall 102, and be supported by the top surface 102E of the bottom plate part 102D of the heat insulating wall 102.

A bottom surface 102F of the bottom plate part 102D of the heat insulating wall 102 may be placed on a heat insulating wall supporter 100A formed on the top surface of the base 100.

An air supply flow path through-hole 102G through which the air supply flow path 154 passes may be formed in the bottom plate part 102D of the heat insulating wall 102. The air supply flow path through-hole 102G may form at least part of a channel that is communicative with a space that is formed in the interior of the container body between a wall of the container body and the beverage ingredient pack 12 mounted inside the container body. Air that is supplied through this channel may exert pressure on the flexible beverage ingredient pack 12, causing the manufactured beverage to be extracted. At least a portion of the air supply flow path 154 may be formed through the heat insulating wall 102, and be connected to the fermentation tank 112.

Meanwhile, the evaporator 134 may be an evaporating tube wound around the outer surface of the fermentation tank 112 to be located in the gap. The evaporator 134 may be in contact with each of the outer surface 112C of the fermentation tank 112 and the inner surface 102C of the heat insulating wall 102. The evaporator 134 may be supported by the heat insulating wall 102.

The evaporator 134 may include an extending tube (not shown) extending to the outside of the heat insulating wall 102 by passing through an evaporating tube through-hole (not shown) formed in the heat insulating wall 102.

The beverage maker may include a heat insulating wall cover 104 and 105 surrounding the circumferential and top surfaces of the heat insulating wall 102.

The heat insulating wall cover 104 and 105 may be configured as one cover, and be configured as an assembly of a plurality of covers.

The heat insulating wall cover 104 and 105 may include a lower heat insulating wall cover 104 of which bottom surface is opened, the lower heat insulating wall cover 104 surrounding the outer circumferential surface of the heat insulating wall 102, and an upper heat insulating wall cover 105 disposed at the top of the lower heat insulating wall cover 104, the upper heat insulating wall cover 105 covering the top surface of the heat insulating wall 102.

A lower portion of the lower heat insulating wall cover 104 may be placed on the base 100.

A lower portion of the upper heat insulating wall cover 105 may be placed on the top end of the lower heat insulating wall cover 104.

The heat insulating wall cover 104 and 105 may protect the heat insulating wall 102, and form a portion of the appearance of the beverage maker.

The heat insulating wall cover 104 and 105 may surround the entire circumferential surface of the heat insulating wall 102, and surround only a portion of the circumferential surface of the heat insulating wall 102.

A side opening may be formed in a surface of the heat insulating wall cover 104 and 105, which faces the water tank 51. The extending tube of the evaporator 134 may be disposed to pass through the side opening. The extending tube of the evaporator 134 may extend to an accommodation space S5 shown in FIG. 4, which will be described later, by passing through the side opening of the heat insulating wall cover 104 and 105.

Meanwhile, the water tank 51 may be spaced apart from the base 100 at the top side of the base 100. The water tank 51 may be spaced apart from the base 100 in the vertical direction. A space S3 in which at least one of the compressor 131, the water supply heater 53, and the water supply pump 52 is to be accommodated may be formed between the water tank 51 and the base 100. In addition, the water tank 51 may be spaced apart from the heat insulating wall 102 in the horizontal direction.

The beverage maker may include a water tank supporter 106 supporting the water tank 51 to be spaced apart from the base 100. The water tank supporter 106 may be disposed at the base 100, and support the water tank 51 to be spaced apart from the base 100 at the top side of the base 100. The bottom end of water tank supporter 106 may be placed on the base 100, and the water tank 51 may be placed at an upper portion of the water tank supporter 106.

The water tank supporter 106 may be configured such that a plurality of supporter members are coupled in a hollow cylindrical shape. A side opening may be formed in a surface of the water tank supporter 106, which faces the heat insulating wall 102.

The water tank 51 may include an outer water tank 58, and an inner water tank 59 accommodated in the outer water tank 58, the inner water tank 59 in which a space S4 having water accommodated therein is formed.

The outer water tank 58 may be placed at an upper portion of the water tank supporter 106, and the bottom surface of the outer water tank 58 may be spaced apart from the top surface of the base 100. The space S3 in which at least one of the compressor 131, the water supply heater 53, and the water supply pump 52 is to be accommodated may be formed between the outer water tank 58 and the base 100.

The outer water tank 58 may have a vessel shape of which top surface is opened, and protect the inner water tank 59 by surrounding the outer circumferential and bottom surfaces of the inner water tank 59 located therein.

The inner water tank 59 may be inserted into the outer water tank 58, and be supported by the outer water tank 58.

The beverage maker may further include a water tank protector 107 disposed at the top side of the outer water tank to surround an upper outer circumferential surface of the inner water tank 59. The water tank protector 107 may be disposed to surround the entire or a portion of the upper outer circumferential surface of the inner water tank 59. The water tank protector 107 may be configured such that a plurality of protector members are coupled in a ring shape.

The beverage maker may further include a water tank lid 108 coupled to the water tank 51 or the water tank protector 107 to cover the top surface of the water tank 51. One side of the water tank lid 108 may be rotatably connected to the water tank 51 or the water tank protector 107. The water tank lid 108 may be separably mounted on the top surface of the water tank 51 or the water tank protector 107.

Meanwhile, at least one of the compressor 131, the water supply heater 53, and the water supply pump 52 may be disposed between the base 100 and the water tank 51.

The condenser 132 may be disposed to face at least one of the space between the heat insulating wall 102 and the water tank 51, and the heat insulating wall 102.

The supplier 3 may be disposed between the fermentation tank cover 114 and the water tank 51. In this case, the beverage maker may be compactly manufactured as compared with when the supplier 3 is located at a position except the space between the fermentation tank cover 114 and the water tank 51, and the supplier 3 may be protected by the fermentation tank cover 114 and the water tank 51.

As shown in FIG. 4, one side of the supplier 3 may be mounted on the outer water tank 58, and the other side of the supplier 3 may be mounted on the heat insulating wall cover 104 and 105. The supplier 3 may be vertically spaced apart from the base 100 at the top side of the base 100.

The supplier 3 may include a capsule accommodation body 36 having the capsule accommodation part in which the capsules C1, C2, and C3 shown in FIG. 1 are attachably/detachably accommodated, and a lid module 37 covering the capsule accommodation part.

One side plate facing the water tank 51 among left and right side plates of the capsule accommodation body 36 may be mounted on a mounting part formed in the outer water tank 58 to be supported by the outer water tank 58.

The other side plate facing the fermentation tank cover 114 among the left and right side plates of the capsule accommodation body 36 may be mounted on the heat insulating wall cover 104 and 105, and be supported by the heat insulating wall cover 104 and 105.

The lid module 37 may include a lid 38 covering the capsule accommodation body 36. The lid 38 may be slidingly disposed at the capsule accommodation body 36 or be rotatably connected to the capsule accommodation body 36. The lid 38 may be hinge-connected to the capsule accommodation body 36.

The supplier 3 may be installed to be located at an approximately central upper portion of the beverage maker, and the user may easily mount or separate the capsules C1, C2, and C3 by upwardly rotating the lid module 37 of the supplier 3.

The accommodation space S5 in which a plurality of parts are to be accommodated may be formed in the beverage maker. Here, the accommodation space S5 may be a space that becomes a space between the heat insulating wall 102 and the water tank 51 in the left-right direction and becomes a space between the supplier 3 and the base 100 in the top-bottom direction.

In the beverage maker, a plurality of parts are preferably accommodated in the accommodation space S5. In this case, the beverage maker may become compact. The plurality of parts accommodated in the accommodation space S5 may be protected by being surrounded by the heat insulating wall 102, the water tank 51, the base 100, the supplier 3, the condenser 132, and a center cover 66 which will be described later.

The opening/closing valves 313, 323, and 333 installed in the supplier entrance flow paths 311, 321, and 331 shown in FIG. 1 to open/close the supplier entrance flow paths 311, 321, and 331, as shown in FIG. 4, may be located under the capsule accommodation body 36.

The opening/closing valves 313, 323, and 333 may be installed in a bracket 64 (see FIG. 3) disposed at the base 100.

The bracket 64 may be disposed to be located at a side of the heat insulating wall 102, and the opening/closing valves 313, 323, and 333 may be installed to be located between the heat insulating wall 102 and the water tank 51 by the bracket 64. The opening/closing valves 313, 323, and 333 may be located between the heat insulating wall 102 and the water tank 51 in the left-right direction, and be located between the base 100 and the supplier 3 in the top-bottom direction.

The beverage maker may further include the center cover 66 covering the front of the opening/closing valves 313, 323, and 333.

The center cover 66, as shown in FIG. 2, may be disposed to cover between the heat insulating wall cover 104 and the water tank supporter 106 in the left-right direction and cover between the supplier 3 and the base 100 in the top-bottom direction. The rear surface of the center cover 66 may face the condenser 132 in the front-rear direction, and protect a plurality of parts.

In addition, a front portion of the supplier 3 may be placed on the top end of the center cover 66, and the supplier 3 may be supported by the center cover 66.

Meanwhile, the beverage extraction valve 62 may be mounted to the center cover 66. The beverage extraction valve 62 may be mounted to protrude forward from the center cover 66. The beverage extraction valve 62 may be mounted to the center cover 66 to be located at the top side of the beverage container 101.

The beverage maker may include a controller 109 that controls the beverage maker.

The controller 109 may include a main PCB 109C.

The controller 109 may include a wireless communication element that performs wireless communication with a wireless communication device such as a remote controller or a portable terminal. The wireless communication element, such as a Wi-Fi module or a Bluetooth module, is not limited to its kind as long as it can perform wireless communication with a remote controller or a wireless communication device. The wireless communication element may be mounted on the main PCB 109C or a display PCB which will be described later.

The controller 109 may include an input unit that receives a command related to the manufacturing of the beverage maker. The input unit may include a rotary knob 109A and a rotary switch 109B switched by the rotary knob 109A. A knob hole 106A through which the rotary knob 109A rotatably passes may be formed at one side of the water tank supporter 106. The rotary knob 109A may be disposed such that at least one portion of the rotary knob 109A is exposed to the outside. The rotary switch 109B may be mounted on the main PCB 109C. The input unit may include a touch screen that receives a command of the user in a touch scheme. The touch screen may be provided in a display 109D which will be described later. The user may input a command through the remote controller or the wireless communication device, and the controller 109 may receive the command of the user through the wireless communication element.

The controller 109 may include the display 109D that displays various information of the beverage maker. The display 109D may include a display element such as LCD, LED, or OLED. The display 109D may include the display PCB on which the display element is mounted. The display PCB may be mounted on the main PCB 109C or be connected to the main PCB 109C through a separate connector.

The display 109D may display information input by the input unit.

The display 109D may display information of the beverage brewing pack 12 and information on a fermentation time of beverage ingredients, a beverage completion time, or the like. The fermentation time of the beverage ingredients or the beverage completion time may be changed depending on kinds of the beverage ingredients contained in the beverage brewing pack 12. If beverage brewing pack 12 approaches the fermentation tank assembly 11, the controller 109 may acquire information from the beverage brewing pack 12 through a communication module such as NFC.

In some implementations, a compact chip in which various information related to the beverage ingredients may be attached in the shape of a sticker, etc. to the beverage brewing pack 12, and the chip and an NFC tag that transmits/receives data may be installed in the beverage maker. In such implementations, the NFC tag may be mounted on the fermentation tank assembly 11, the main PCB 109C, or the display PCB. When the NFC tag is mounted on the fermentation tank assembly 11, the NFC tag may be mounted on the opening 111 of the fermentation tank 112 or the fermentation tank cover 114. The NFC tag may be connected to the controller 109 through a data line.

If the beverage brewing pack 12 is accommodated in the fermentation tank assembly 11, the controller 109 may acquire information of the beverage brewing pack 12 from a chip provided in the beverage brewing pack 12.

In some implementations, when the NFC tag is installed on the display PCB, the NFC tag may be installed at a front portion of the beverage maker. If the beverage brewing pack 12 comes close to the front portion of the beverage maker by the user, the controller 109 may acquire information related to beverage-making ingredients from the beverage brewing pack 12.

The controller 109 may transmit the information acquired from the NFC tag to the display 109D or the wireless communication device, and the display 109D or the wireless communication device may display kinds of beverage ingredients, a total fermentation time, a beverage completion time, or the like.

In some implementations, the controller 109 may acquire information related to beverage-making ingredients from the wireless communication device through the wireless communication element. The wireless communication device may receive the information related to the beverage-making ingredients from the user, or acquire the information related to the beverage-making ingredients from the beverage brewing pack 12 using an NFC communication module. The wireless communication device may transmit the acquired information to the beverage-making apparatus.

The display 109D may display various information related to brewing of beverage while the beverage is being brewed. The controller 109 may be connected to the temperature sensor 16. The controller 109 may transmit information on a temperature sensed by the temperature sensor 16 to the display 109D or the wireless communication device, and the display 109D or the communication device may display the temperature sensed by the temperature sensor 16 through a numerical value, a graph, or the like.

The display 109D may display a completion degree of the beverage, an amount of carbonic acid contained in the beverage, or the like through a numerical value, a graph, or the like while the beverage is being brewed.

The display 109D may differently display a completion degree of the beverage in primary fermentation and a completion degree of the beverage in secondary fermentation. The amount of carbonic acid in the beverage of the beverage brewing pack 12 may be gradually increased as time elapses. The controller 109 may detect a pressure in the beverage brewing pack 12 through the pressure sensor 72, and detect a temperature of the fermentation tank assembly 11 through the temperature sensor 16. The controller 109 may calculate an amount of carbonic acid using the detected pressure and temperature according to a preset equation or table. The controller 109 may transmit information on the calculated amount of carbonic acid to the display 109D or the wireless communication device, and at least one of the display 109D and the wireless communication device may display the calculated amount of carbonic acid.

The display 109D may display a remaining amount of the beverage after the beverage is completely brewed.

If the secondary fermentation which will be described later is ended, the controller 109 may determine that the beverage has been completely brewed.

The controller 109 may add up at least one of a time required to turn on the micro switch, a time required to drive the air pump 152, and a time required to turn on the main valve 9 after the beverage is completely brewed. The controller 109 may calculate an extraction amount of the beverage according to the added-up time, and calculate a remaining amount of the beverage from the calculated extraction amount. The controller 109 may transmit information on the remaining amount of the beverage to the display 109D or the wireless communication device, and at least one of the display 109D and the wireless communication device may display the remaining amount of the beverage.

Figure 5:
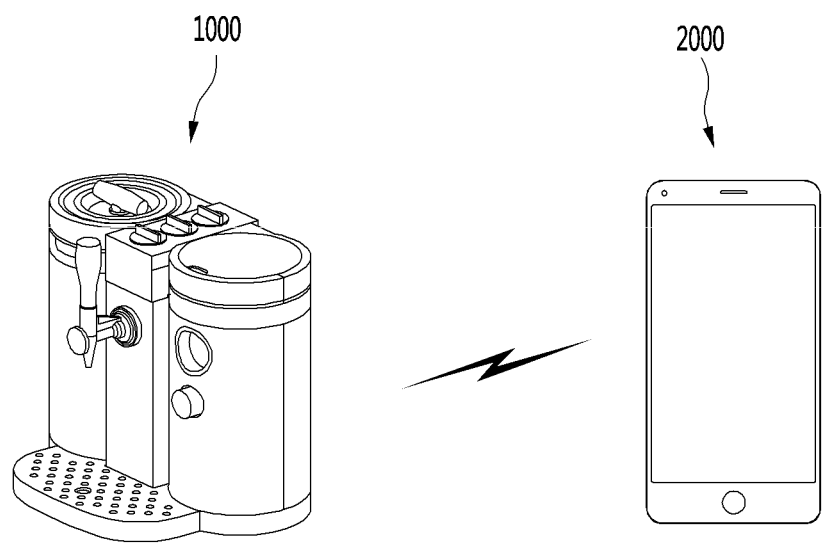
FIG. 5 is a diagram illustrating an example of a system including a beverage-making apparatus and a mobile terminal communicative with the beer maker according to some implementations.

FIG. 5 is a diagram illustrating an example of a system including a beverage-making apparatus and a mobile terminal connected to the beverage-making apparatus according to an implementation.

Referring to FIG. 5, the system may include a beverage-making apparatus 1000 and a mobile terminal 2000 connected to the beverage-making apparatus 1000. The beverage-making apparatus 1000 shown in FIG. 5 may correspond, for example, to the beverage-making apparatus described in FIGS. 1 to 4.

The beverage-making apparatus 1000 and the mobile terminal 2000 may be connected through wireless communications, for example through a wireless communication protocol. The wireless communication protocol may be, for example, Wi-Fi, Bluetooth, ZigBee, or any other suitable wireless communication protocol. As other examples, the mobile terminal 2000 may communicate with the beverage-making apparatus 1000 using short-range wireless communication signals, or may indirectly communicate via an intermediate device, such as a relay or a router.

The beverage-making apparatus 1000 may transmit various information related to the beverage-making apparatus 1000 to the mobile terminal 2000. The various information may include, for example, information related to an on/off state of the beverage-making apparatus 1000, information related to a type of the beverage-making apparatus 1000, information related to beverage ingredients acquired from the beverage brewing pack 12 and/or supplier 3 of apparatus 1000, beverage brewing information based on beverage ingredients of the apparatus 1000, and/or beverage maintenance or storage information related to the apparatus 1000.

The mobile terminal 2000 may store one or more programs, such as applications, that when executed by one or more processors, perform operations of providing brewing information regarding the beverage-making apparatus 1000. For example, if the stored application is executed, the mobile terminal 2000 may display information received from the beverage-making apparatus 1000, such as information regarding ingredients or recipes for making a beverage using apparatus 1000, or remotely control an operation of the beverage-making apparatus 1000 based on the displayed information.

The mobile terminal 2000 may include, for example, a cellular phone, a smart phone, a laptop computer, a terminal for digital broadcast, a personal digital assistant (PDA), a portable multimedia player (PMP), a navigation system, a tablet PC, an ultrabook, a wearable device (e.g., a smart-watch, a smart glass, or a head mounted display (HMD)), and the like. An example of a configuration of the mobile terminal 2000 will be described with reference to FIG. 6.

Figure 6:
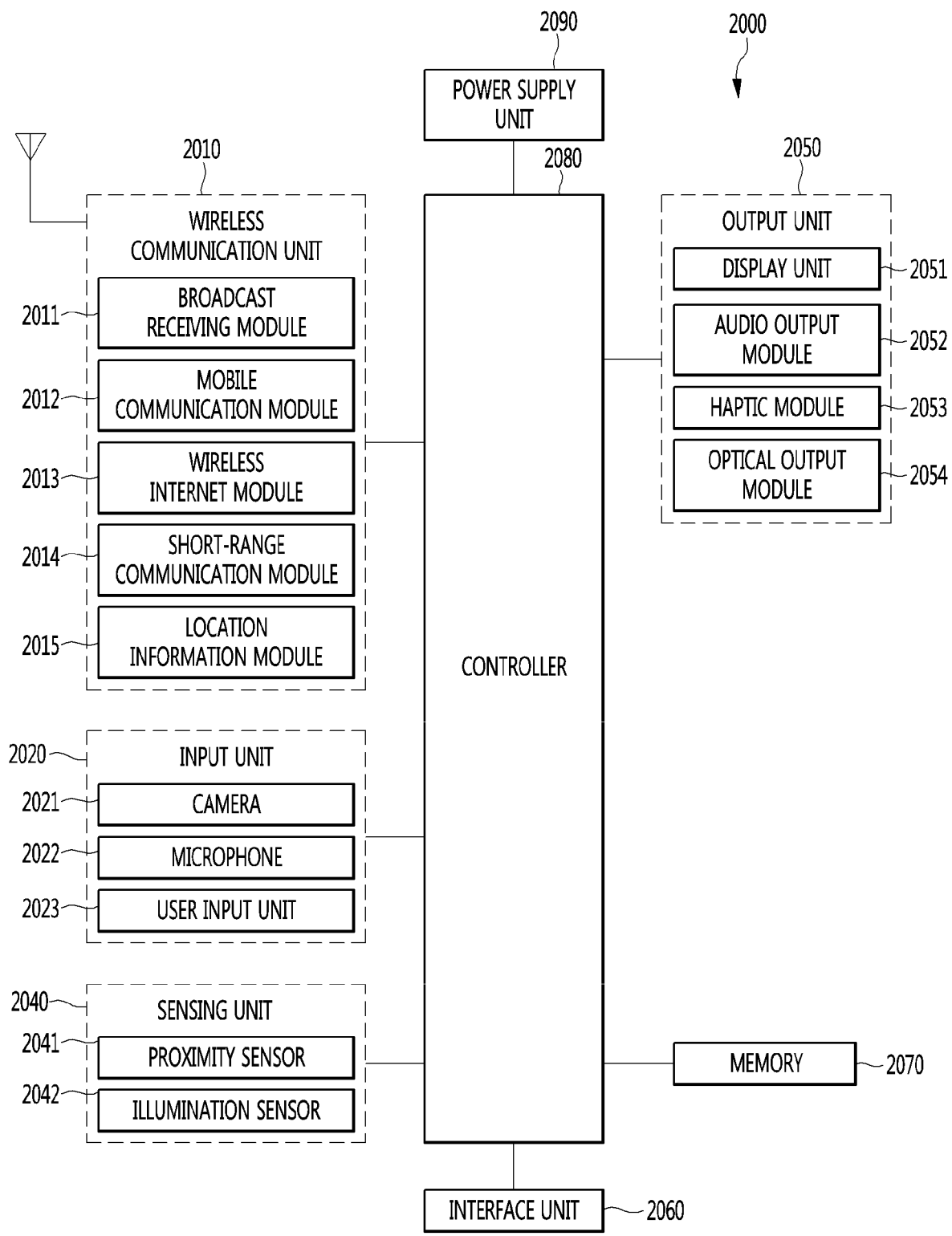
FIG. 6 is a block diagram illustrating an example of a mobile terminal according to some implementations.

FIG. 6 is a schematic block diagram of an example of a mobile terminal according to an implementation.

In this example, the mobile terminal 2000 is shown having components such as a wireless communication unit 2010, an input unit 2020, a sensing unit 2040, an output unit 2050, an interface unit 2060, a memory 2070, a controller 2080, and a power supply unit 2090. However, not all implementations of the present disclosure necessarily implement all of the illustrated components in FIG. 6, and greater or fewer components may alternatively be implemented.

Referring to FIG. 6, the mobile terminal 2000 is shown having wireless communication unit 2010. The wireless communication unit 2010 includes one or more components which enable wireless communication between the mobile terminal 2000 and other devices, such as the beverage-making apparatus 1000 or other devices on a wireless communication system or network with which the mobile terminal 2000 is communicative.

In this example, the wireless communication unit 2010 includes one or more modules which enable communications, e.g., wireless communications between the mobile terminal 2000 and a wireless communication system, communications between the mobile terminal 2000 and another device or mobile terminal, and/or communications between the mobile terminal 2000 and an external server. Further, the wireless communication unit 2010 includes one or more modules which connect the mobile terminal 2000 to other devices. To facilitate such communications, in the example of FIG. 6, the wireless communication unit 2010 includes one or more of a broadcast receiving module 2011, a mobile communication module 2012, a wireless Internet module 2013, a short-range communication module 2014, and a location information module 2015.

The mobile terminal 2000 in FIG. 6 also implements an input unit 2020, which includes a camera 2021 for obtaining images or video, a microphone 2022, which is one type of audio input device for inputting an audio signal, and a user input unit 2023 (for example, a touch key, a push key, a mechanical key, a soft key, and the like) for allowing a user to input information. Data (for example, audio, video, image, and the like) is obtained by the input unit 2020 and may be analyzed and processed by controller 2080 according to device parameters, user commands, and combinations thereof.

The mobile terminal 2000 also includes a sensing unit 2040 that is implemented with one or more sensors configured to sense internal information of the mobile terminal 2000, the surrounding environment of the mobile terminal 2000, user information, and the like. For example, in FIG. 6, the sensing unit 2040 is shown having a proximity sensor 2041 and an illumination sensor 2042.

In some implementations, the sensing unit 2040 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 2021), a microphone 2022, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), to name a few. The mobile terminal 2000 may be configured to utilize information obtained from sensing unit 2040, and in particular, information obtained from one or more sensors of the sensing unit 2040, and combinations thereof.

The mobile terminal 2000 also includes an output unit 2050 configured to output various types of information, such as audio, video, tactile output, and the like. In the example of FIG. 6, the output unit 2050 is shown having a display unit 2051, an audio output module 2052, a haptic module 2053, and an optical output module 2054.

The display unit 2051 may have an inter-layered structure or an integrated structure with a touch sensor in order to facilitate a touch screen. The touch screen may provide an output interface between the mobile terminal 2000 and a user, as well as providing a function as the user input unit 2023 which provides an input interface between the mobile terminal 2000 and the user.

The mobile terminal 2000 of FIG. 6 also implements an interface unit 2060, which serves as an interface with various types of external devices that can be coupled to the mobile terminal 2000. The interface unit 2060, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 2000 may perform assorted control functions associated with a connected external device, in response to the external device being connected to the interface unit 2060.

The mobile terminal 2000 also implements a memory 2070 that stores data to support various functions or features of the mobile terminal 2000. For instance, the memory 2070 may be configured to store application programs executed in the mobile terminal 2000, data or instructions for operations of the mobile terminal 2000, and the like. Some of these application programs may be downloaded from an external server via wireless communication. Other application programs may be installed within the mobile terminal 2000 at time of manufacturing or shipping, which is typically the case for basic functions of the mobile terminal 2000 (for example, receiving a call, placing a call, receiving a message, sending a message, and the like). It is common for application programs to be stored in the memory 2070, installed in the mobile terminal 2000, and executed by the controller 2080 to perform an operation (or function) for the mobile terminal 2000. Although the memory 2070 is shown in FIG. 6 as being a component that is separate and distinct from other components of FIG. 6, implementations are not limited thereto, and the memory 2070 may represent a collection of different memory elements that are implemented in different components of FIG. 6.

The mobile terminal 2000 also includes one or more processors, such as controller 2080, which functions to control overall operation of the mobile terminal 2000, in addition to the operations associated with the application programs. The controller 2080 may provide or process information or functions appropriate for a user by processing signals, data, information and the like, which are input or output by the various components depicted in FIG. 6, or activating application programs stored in the memory 2070. As one example, the controller 2080 controls some or all of the components illustrated in FIGS. 1A-1C according to the execution of an application program that have been stored in the memory 2070. Although the controller 2080 is shown in FIG. 6 as being a component that is separate and distinct from other components of FIG. 6, implementations are not limited thereto, and the controller 2080 may represent a collection of different processors that are implemented in different components of FIG. 6.

The mobile terminal 2000 also includes a power supply unit 2090 that is configured to receive external power or provide internal power in order to supply appropriate power required for operating elements and components included in the mobile terminal 2000. In some implementations the power supply unit 2090 may include a battery, and the battery may be configured to be embedded in the terminal body, or configured to be detachable from the terminal body.

Various implementations described herein may be implemented in a computer-readable medium, a machine-readable medium, or similar medium using, for example, software, hardware, or any combination thereof.

Figure 7A:
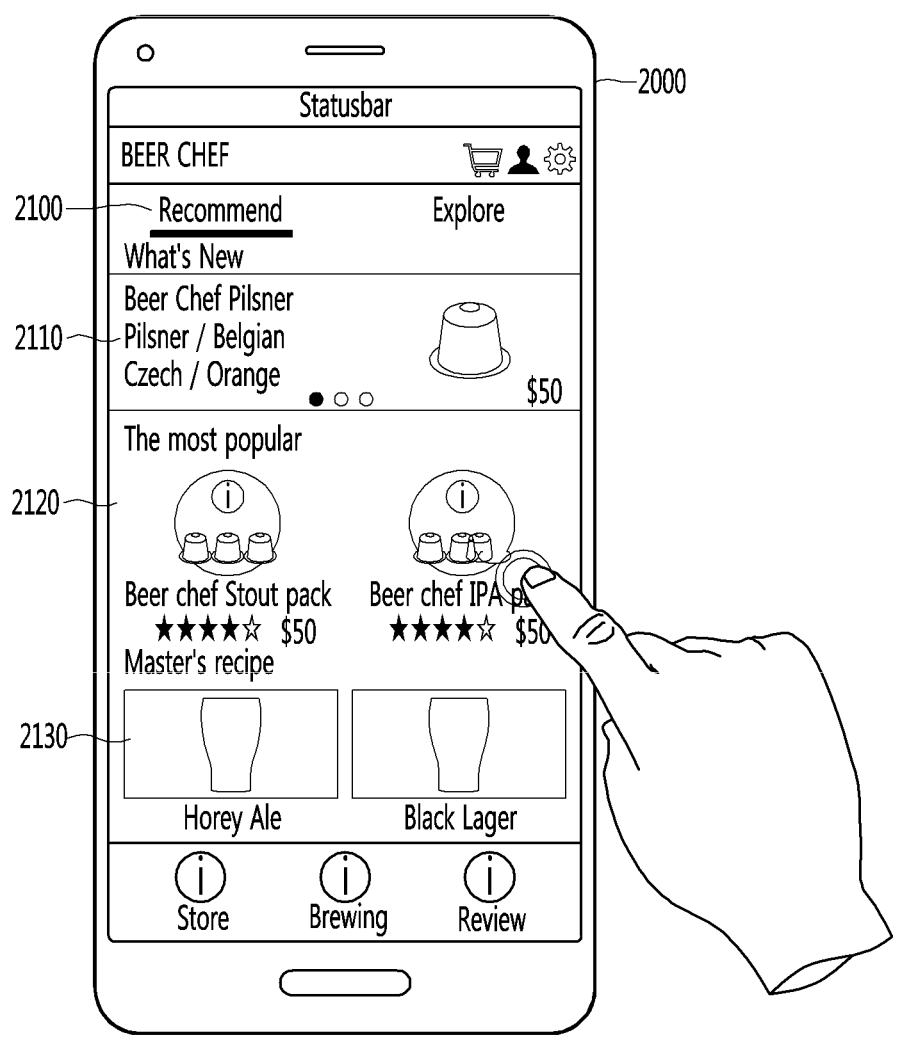
FIG. 7A is a diagram illustrating an example of a recommended recipe screen on which the mobile terminal provides recommended recipe information of beverage-making using the beverage-making apparatus according to some implementations.

FIG. 7A is diagram illustrating an example of a recommended recipe screen on which the mobile terminal, such as terminal 2000, provides recommended recipe information of a beverage that is brewed using the beverage-making apparatus, such as apparatus 1000, according to an implementation.

Referring to FIG. 7A, the mobile terminal 2000 may display, e.g., through display unit 2051 of FIG. 6, a recommended recipe screen 2100 that provides recommended recipe information on a beverage that is brewed using the beverage-making apparatus 1000.

Beverage recipe information may include at least one beverage ingredient. For example, in implementations where the beverage-making apparatus 1000 is a beer-maker, the beverage ingredient included in the beverage recipe information may include four different ingredients, such as wort (or malt), yeast, hops, and flavor additives.

The recommended recipe screen 2100 may provide information on a recommended recipe among beverage recipes that can be acquired, e.g., purchasable, by a user. In the example of FIG. 7A, the recommended recipe screen 2100 includes a new recipe information window 2110 that provides information on newly-released beverage recipes, a popular recipe information window 2120 that provides information on popular recipes, e.g., based on sales volumes or user reviews, and an expert recipe information window 2130 that provides information on recipes recommended or registered by experts. However, implementations are not limited to the example of recommended recipe screen 2100 shown in FIG. 7A, and the configuration of the recommended recipe screen 2100 may be variously modified in some implementations.

One or more processors of the mobile terminal 2000, such as controller 2080 of FIG. 6, may receive an input for selecting any one of beverage recipes displayed on the recommended recipe screen 2100. The controller 2080 may display recipe information screen regarding the selected beverage recipe in response to the received input. This will be described next with reference to FIG. 7B.

Figure 7B:
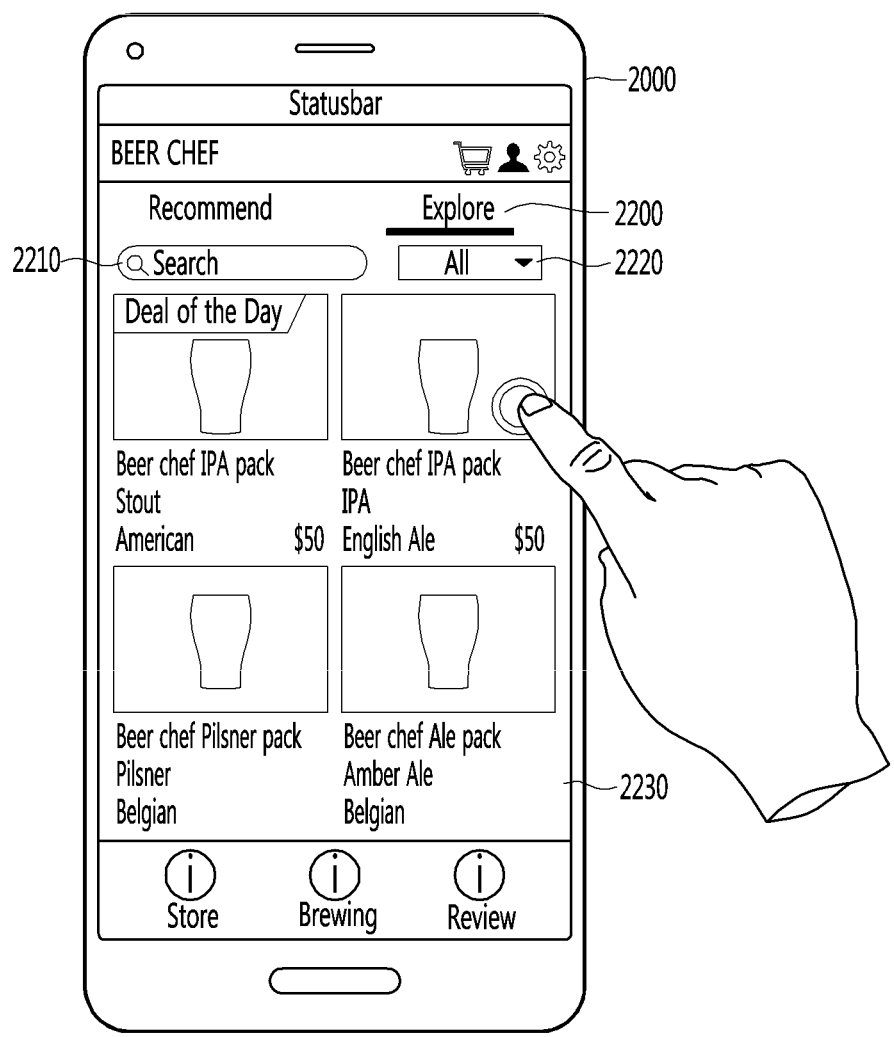
FIG. 7B is a diagram illustrating an example of a recipe search screen providing a search function of a beverage-making recipe.

FIG. 7B is a diagram illustrating an example of a recipe search screen providing a search function of a beverage recipe or ingredient.

Referring to the example in FIG. 7B, the mobile terminal 2000 may display, through the display unit 2051, a recipe search screen 2200 that provides a search function of a beverage recipe to make a beverage using beverage-making apparatus 1000.

In this example, the recipe search screen 2200 includes a search word input window 2210 for inputting a search word for recipe search, a category selection window 2220 for selecting a category of a recipe or category of an ingredient included in the recipe, and a search result window 2230 for displaying at least one recipe information or at least one ingredient information, which is acquired based on a search result. In some implementations, when a recipe search operation is not performed, the search result window 2230 may display information recipes or ingredients corresponding to current category information of the category selection window 2220.

The controller 2080 may receive an input for selecting any one of beverage recipes displayed on the search result window 2230. The controller 2080 may display recipe information screen on the selected beverage recipe in response to the received input. This will be described next with reference to FIG. 7C.

Figure 7C:
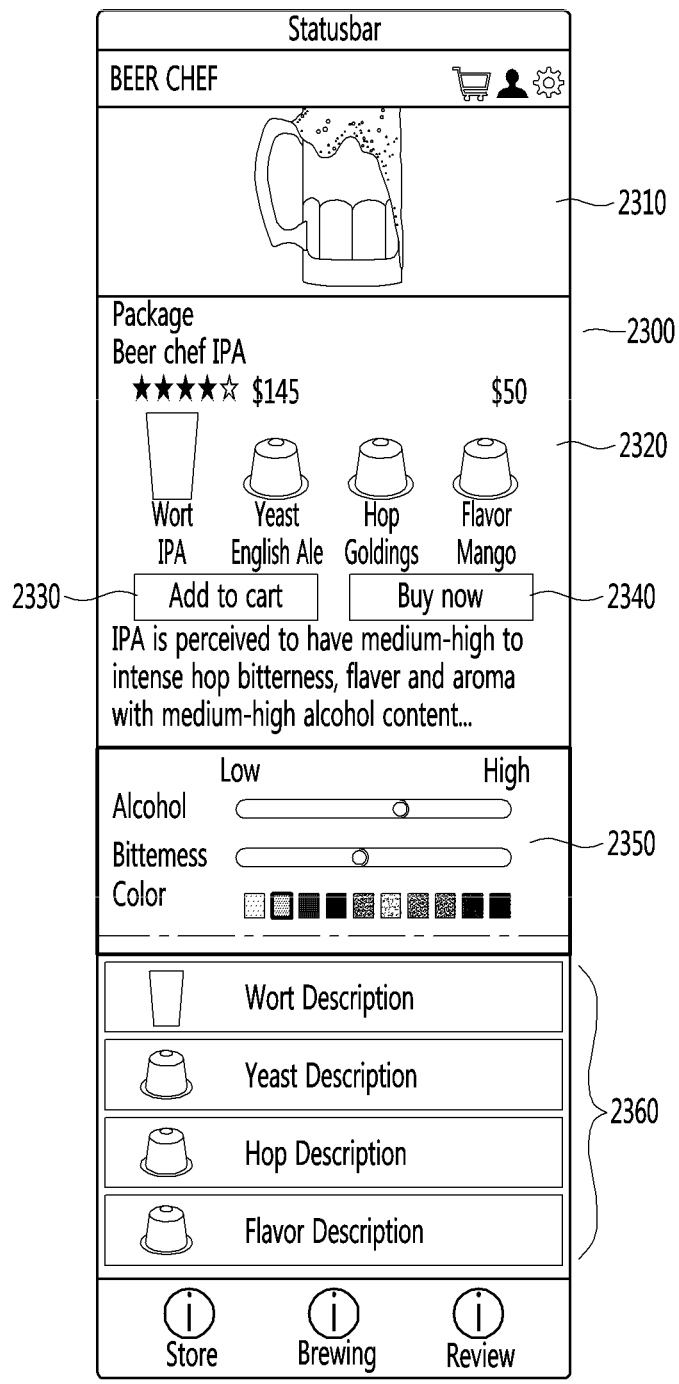
FIG. 7C is a diagram illustrating an example of a recipe information screen providing information on a beverage-making recipe selected by a user.

FIG. 7C is a diagram illustrating an example of a recipe information screen providing information on a beverage recipe selected by the user.

Referring to FIG. 7C, the controller 2080 may receive an input for selecting any one beverage recipe among the beverage recipes displayed on the recommended recipe screen 2100 or the search result window 2230. The controller 2080 may display, through the display unit 2051, a recipe information screen 2300 that provides information on the selected beverage recipe, in response to the received input.

For example, the recipe information screen 2300 may include an image 2310 related to a beverage corresponding to the beverage recipe, beverage ingredient information 2320 related to one or more ingredients included in the beverage recipe, a cart storage menu 2330 for storing a beverage recipe and/or ingredients in a cart, a purchase menu 2340 for acquiring, e.g., purchasing, the corresponding beverage recipe and/or ingredients, characteristic information 2350 that displays information related to one or more characteristics of the beverage corresponding to the beverage recipe, and an ingredient detailed information menu 2360 for displaying more detailed information of beverage ingredients included in the beverage recipe. However, implementations are not limited to the particular example shown in FIG. 7C, and the configuration of the recipe information screen 2300 may be variously modified.

In some implementations, based on the user interface screens shown in FIGS. 7A to 7C, the user may acquire, e.g., purchase, individual ingredients for brewing a beverage, rather than acquiring a fixed set of ingredients in recipe form. For example, the user may acquire individual ingredients in a package form, or select and purchase each ingredient individually. Furthermore, in some implementations, when the user selects and purchases different ingredients individually, the mobile terminal 2000 may automatically determine and recommend a recipe that is suitable for the individual ingredients selected by the user. Various implementations related to this will be described with reference to the accompanying drawings.

Figure 8:
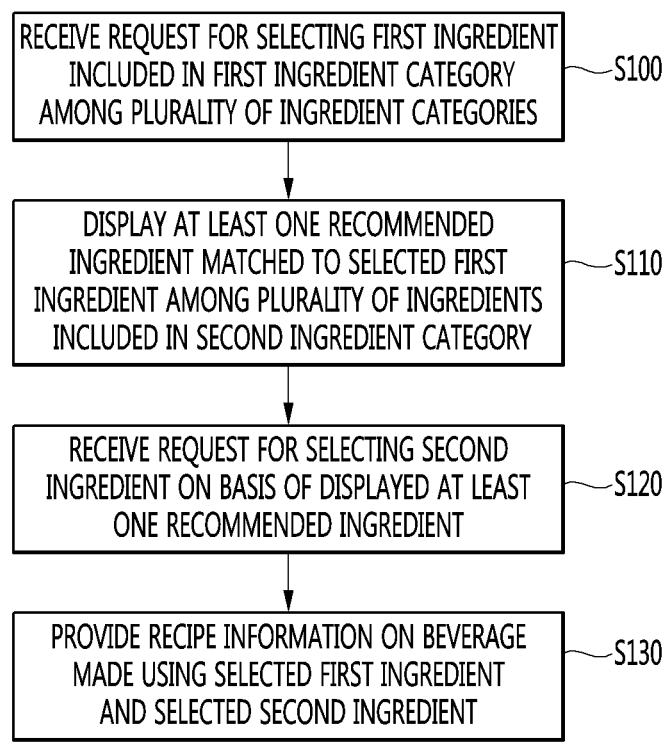
FIG. 8 is a flowchart illustrating an example of providing a recipe of making a beverage using a beverage-making apparatus, performed by the mobile terminal according to some implementations.

FIG. 8 is a flowchart illustrating an example of providing a recipe of a beverage, performed by the mobile terminal (e.g., mobile terminal 2000) for making a beverage using a beverage-making apparatus (e.g., apparatus 1000) according to an implementation. In this example, the mobile terminal 2000 determines and provides recommendations for ingredients and for recipes, based on a user selection of a particular individual ingredients.

Referring to FIG. 8, the mobile terminal (e.g., mobile terminal 2000) may receive a request for selecting a first ingredient. The first ingredient may be included in a first ingredient category among a plurality of ingredient categories included in a beverage recipe (S100) for making a beverage using beverage-making apparatus 1000. Such ingredient categories may be provided based on information about the apparatus 1000.

The beverage recipe may include a plurality of different ingredient categories. For example, if the beverage-making apparatus 1000 is a beer-marker, the plurality of ingredient categories may correspond to wort (or malt), yeast, hops, and flavor additives. Within each category may be one or more ingredients of that category.

One or more processors of mobile terminal 2000 (e.g., controller 2080) may receive (e.g., through user input unit 2023) the user's request for selecting the first ingredient among a plurality of ingredients included in the first ingredient category (e.g., the wort) among the plurality of ingredient categories.

Based on the selected first ingredient in step S100, the mobile terminal 2000 may then determine and display at least one recommended ingredient among a plurality of ingredients in a second ingredient category (S110).

For example, the mobile terminal 2000 may acquire information on the at least one recommended ingredient based on the selected first ingredient. The controller 2080 may acquire such information, for example, from one or more memory devices (e.g., memory 2070) of the mobile terminal 2000, or acquire such information from an external device (e.g., a server) connected to the mobile terminal 2000.

As an example, if the first ingredient category is wort, then the second ingredient category may include at least one of yeast, hops, or flavor additives. In such an example, based on the user selecting a particular ingredient from the "wort" category, the controller 2080 may display at least one ingredient from the "yeast" category, display at least one ingredient from the "hop" category, or display at least one ingredient from the "flavor additive" category. The ingredients that are recommended from the yeast, hop, and flavor additive categories may be ones that are determined to be suitable for the selected wort. As such, the mobile terminal 2000 may adaptively and intelligently provide recommendations for compatible ingredients, based on a selection of an ingredient by the user.

In some implementations, the second ingredient category may include the other ingredient categories except the first ingredient category. In this case, the controller 2080 may display at least one recommended ingredient including beverage ingredients matched to the first ingredient among a plurality of ingredients respectively included in the other ingredient categories, based on the selected first ingredient. In this case, the at least one recommended ingredient may be configured as a combination of beverage ingredients respectively included in the other ingredient categories. For example, in the scenario of the beverage-making apparatus being a beer-maker, the controller 2080 may display at least one combination of yeast, hops, and flavor additives, which are matched to the selected wort.

The mobile terminal 2000 may receive a request for selecting a second ingredient on the basis of the displayed at least one recommended ingredient (S120). For example, the controller 2080 may receive a request for selecting, as the second ingredient, any one ingredient among one or more recommended ingredients displayed through the display unit 2051, or through any suitable input of the mobile terminal 2000.

The mobile terminal 2000 may also provide recipe information for a beverage that is brewed using the selected first ingredient and the selected second ingredient (S130). For example, the controller 2080 may acquire beverage recipe information that includes the selected first and second ingredients, among a plurality of beverage recipe information. The beverage recipe information may be acquired, for example, from a memory device (e.g., memory 2070) of the mobile terminal 2000, or from a server connected to the mobile terminal 2000, or from any suitable source of information acquired by mobile terminal 2000.

In some implementations, the controller 2080 may perform similar operations for additional ingredients in additional categories, such as a third ingredient category and/or a fourth ingredient category, in addition to the first ingredient category and the second ingredient category. As such, the controller 2080 may receive a request for sequentially selecting a first ingredient, a second ingredient, a third ingredient, and a fourth ingredient, and provide the user with beverage recipe information including the selected first to fourth ingredients. This will be described later with reference to FIGS. 10A to 10E.

Figure 9A:
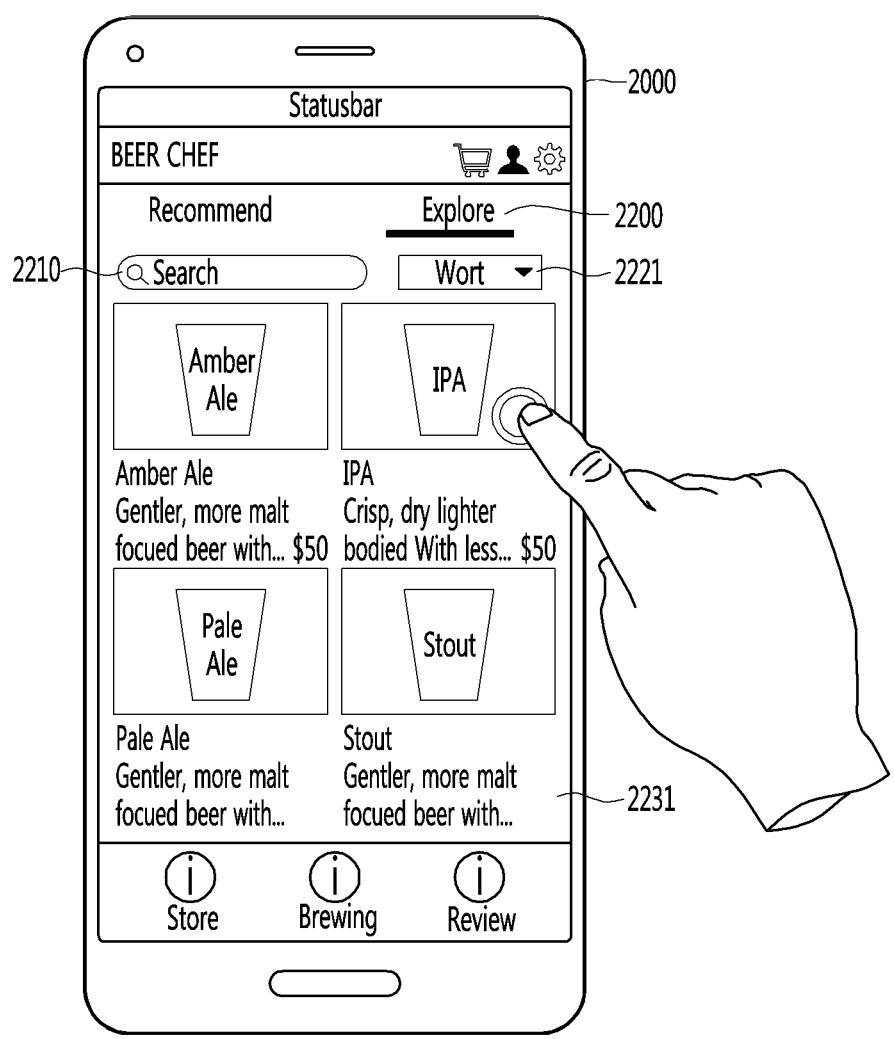
FIGS. 9A and 9B are diagrams illustrating examples of user interfaces related to providing a recipe of making a beverage using a beverage-making apparatus, as shown in FIG. 8.
Figure 9B:
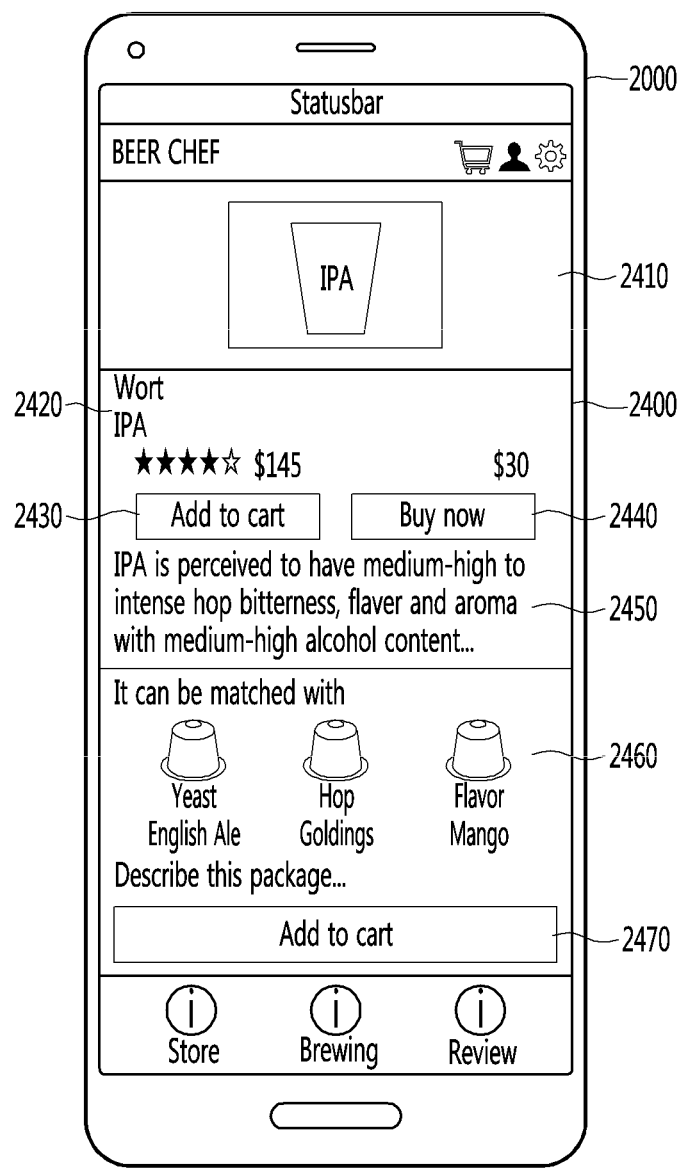

FIGS. 9A and 9B are diagrams illustrating examples of providing ingredient and recipe information related to the operations shown in FIG. 8.

Referring to FIG. 9A, the controller 2080 may display a plurality of ingredients included in a first ingredient category for making a beverage using beverage-making apparatus 1000. For example, the controller 2080 may receive an input for selecting a first ingredient category 2221 through a category selection window of the recipe search screen 2200. The controller 2080 may display a plurality of ingredients 2231 included in the first ingredient category 2221 in response to the received input.

The controller 2080 may receive an input for selecting any one ingredient among the plurality of ingredients 2231, and select the one ingredient as a first ingredient in response to the received input.

Referring to FIG. 9B, the controller 2080 may display, through the display unit 2051, an ingredient information screen 2400 including information on the selected first ingredient. The ingredient information screen 2400 may include an image 2410 of the selected first ingredient, a name 2420 of the first ingredient, a cart storage menu 2430 for storing the first ingredient in a cart, a purchase menu 2440 for immediately purchasing the first ingredient, and a description 2450 of the first ingredient.

Particularly, the controller 2080 may display recommended ingredients 2460 of the other ingredient categories on the basis of the selected first ingredient. The controller 2080 may acquire information of the other ingredients from the server or the memory 2070, based on the selected first ingredient. In an example where in the beverage-making apparatus 1000 is a beer-maker, if the first ingredient category is wort, and the selected first ingredient in the wort category is 'IPA,' then the controller 2080 may acquire information on yeast, hop, and flavor additive, which are suitable for 'IPA.' If the yeast, hop, and flavor additive, which are suitable for 'IPA,' are 'English Ale,' 'Goldings,' and 'Mango,' respectively, the controller 2080 may display the corresponding ingredients as the recommended ingredients 2460. Also, the controller 2080 may further provide information on beverage brewed by the first ingredient and the recommended ingredients 2460.

In some implementations, the controller 2080 may display a package cart storage menu 2470 for storing the first ingredient and the recommended ingredients 2460 in a package form in the cart. Accordingly, the user can conveniently purchase a package of a beverage recipe configured with the recommended ingredients on the basis of the first ingredient. The package cart storage menu 2470 may generally be any selectable interface for storing information regarding ingredients that a user has selected for possible purchase.

FIGS. 10A to 10E are diagrams showing examples of providing information related to the operations shown in FIG. 8.

According to the implementations shown in FIGS. 10A to 10E, the user may select, e.g., sequentially, beverage ingredients constituting a beverage recipe for making a beverage using beverage-making apparatus 1000. Such ingredients may be displayed based on information about the apparatus 1000 acquired by terminal 2000, for example through communication with apparatus 1000 or through information stored in the terminal 2000 or other memory location.

Figure 10A:
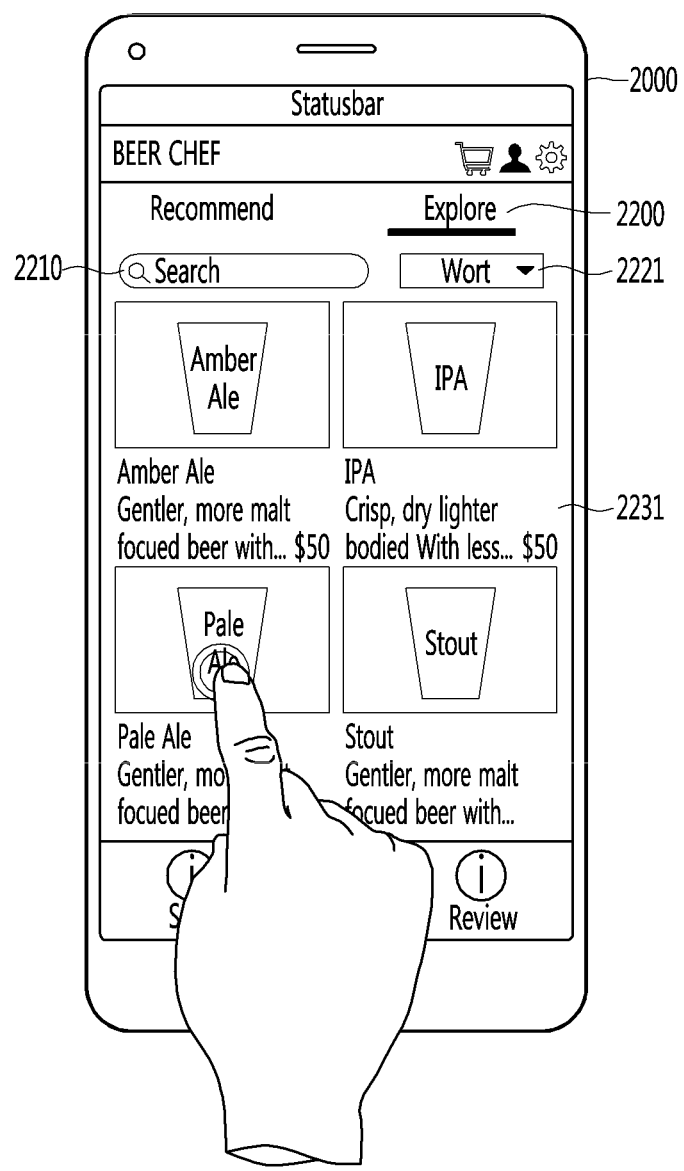
FIGS. 10A to 10E are diagrams illustrating examples of user interfaces related to providing a recipe of making a beverage using a beverage-making apparatus, as shown in FIG. 8.

Referring to FIG. 10A, the controller 2080 may display a plurality of ingredients included in a first ingredient category. As in FIG. 9A, the controller 2080 may receive an input for selecting the first ingredient category 2221 through the category selection window of the recipe search screen 2200. The controller 2080 may display the plurality of ingredients 2231 included in the first ingredient category 2221 in response to the received input.

The controller 2080 may receive an input for selecting any one ingredient among the plurality of ingredients 2231, and select the any one ingredient as a first ingredient in response to the received input.

Figure 10B:
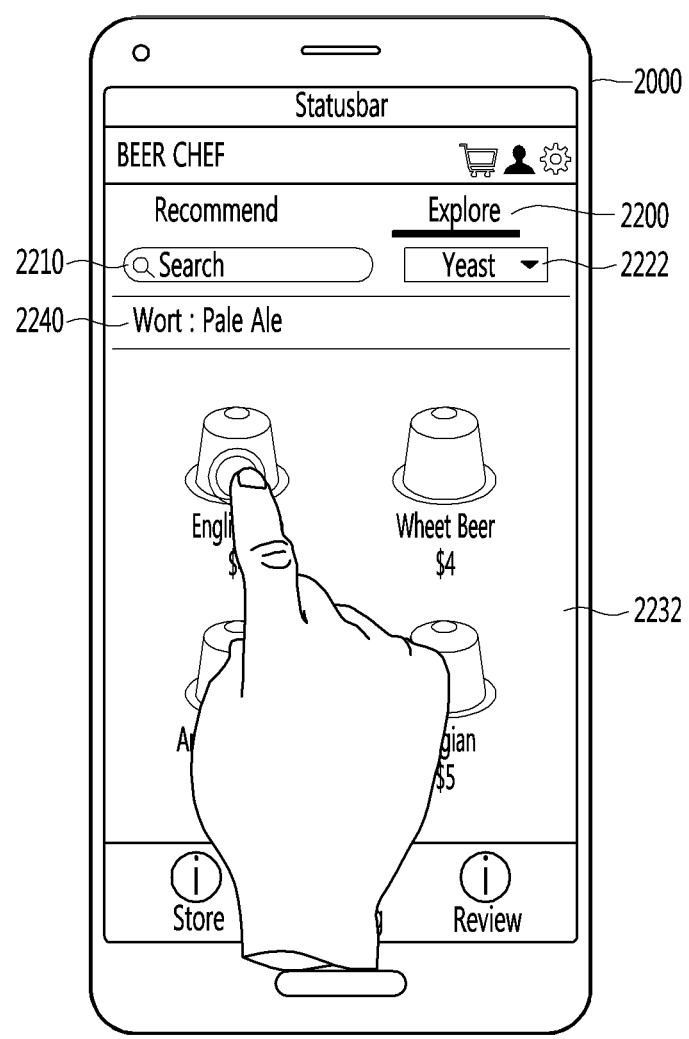

Referring to FIG. 10B, if the first ingredient is selected, the controller 2080 may change the category selection window into a second ingredient category 2222. The controller 2080 may display a plurality of ingredients 2232 on the basis of the selected first ingredient among the plurality of ingredients included in the second ingredient category 2222. In some implementations, the controller 2080 may display, on the recipe search screen 2200, an ingredient selection history 2240 including the selected first ingredient.

In some implementations, the controller 2080 may display only ingredients that are suitable for the first ingredient selected in FIG. 10A, among the plurality of ingredients included in the second ingredient category 2222. In such implementations, the user can conveniently select a second ingredient that is suitable for the first ingredient.

In some implementations, if a second ingredient is selected, the controller 2080 may display at least one beverage recipe information including the first ingredient and the second ingredient. As such, even though ingredients of the other ingredient categories except the first ingredient category and the second ingredient category are not selected, the controller 2080 may provide at least one beverage recipe information on the basis of the selected ingredients.

In the examples of FIGS. 10A to 10E, scenarios are illustrated in which ingredients of all ingredient categories are selected.

Figure 10C:
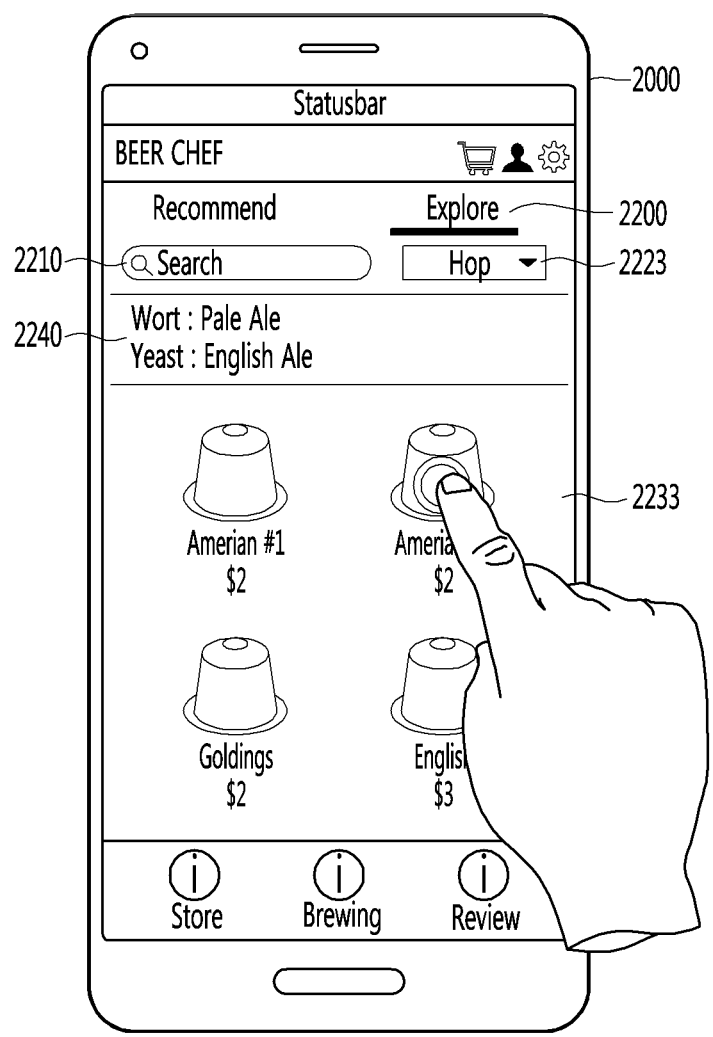

FIG. 10C, if the first ingredient and the second ingredient are selected, the controller 2080 may change the category selection window into a third ingredient category 2223. The controller 2080 may display a plurality of ingredients 2233 on the basis of the first ingredient and the second ingredient among a plurality of ingredients included in the third ingredient category 2223. In some implementations, the controller 2080 may display, on the recipe search screen 2200, an ingredient selection history 2240 including the selected first and second ingredients.

In some implementations, the controller 2080 may display only ingredients that are suitable for the first and second ingredients selected in FIGS. 10A and 10B, among the plurality of ingredients included in the third ingredient category 2223. Thus, the user can conveniently select a third ingredient that is suitable for the first ingredient and the second ingredient.

Figure 10D:
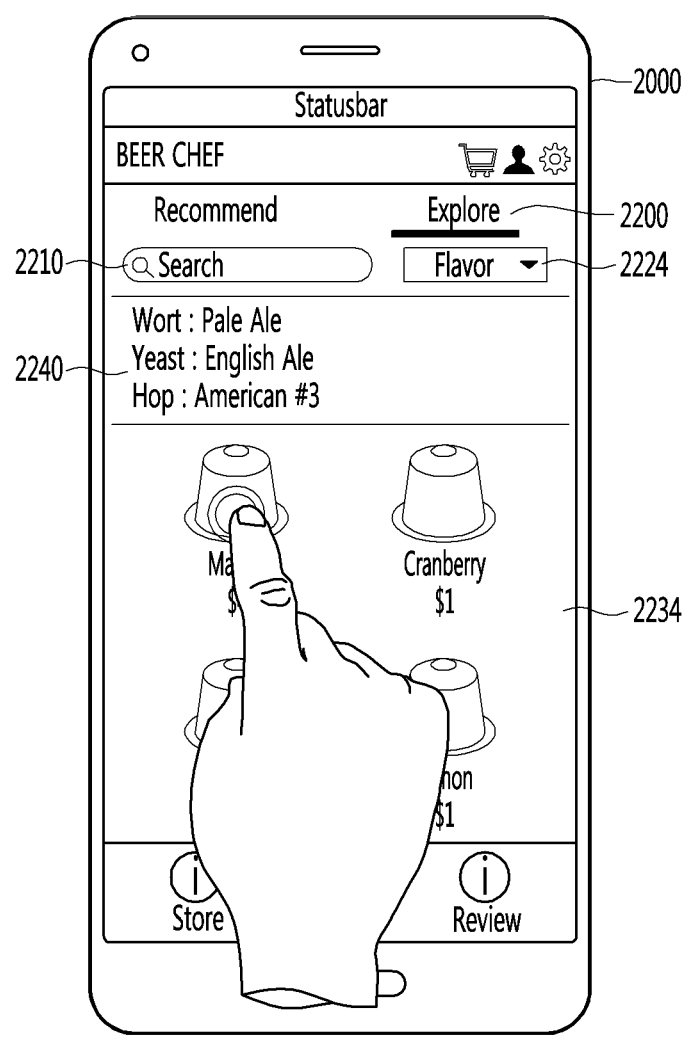

Referring to FIG. 10D, if the first to third ingredients are selected, the controller 2080 may change the category selection window into a fourth ingredient category 2224. The controller 2080 may display a plurality of ingredients 2234 on the basis of the selected first to third ingredients among a plurality of ingredients included in the fourth ingredient category 2224. In some implementations, the controller 2080 may display, on the recipe search screen 2200, an ingredient selection history 2240 including the selected first to third ingredients.

In some implementations, the controller 2080 may display only ingredients suitable for the first to third ingredients selected through FIGS. 10A to 10C among the plurality of ingredients included in the fourth ingredient category 2224. Thus, the user can conveniently select a fourth ingredient suitable for the first to third ingredients.

Figure 10E:
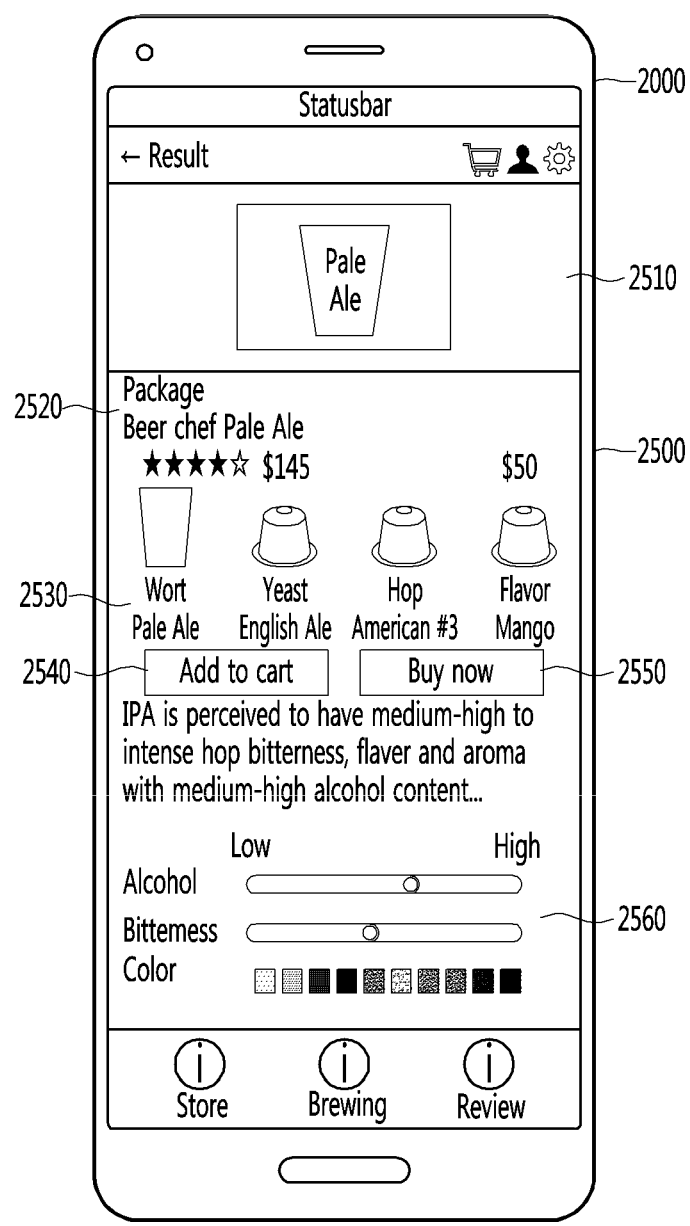

Referring to FIG. 10E, if the first to fourth ingredients are all selected, the controller 2080 may display beverage recipe information including the selected first to fourth ingredients through a recipe information screen 2500.

Similarly to the recipe information screen 2300 shown in FIG. 7C, the recipe information screen 2500 of FIG. 10E, may include an image 2510 related to beverage corresponding to a beverage recipe, a name 2520 of the beverage recipe, information 2530 of the selected first to fourth ingredients selected through FIGS. 10A to 10D, a cart storage menu 2540 for storing the first to fourth ingredients in a cart, a purchase menu 2550 for immediately purchasing the first to fourth ingredients, and characteristic information 2560 of beverage corresponding to the beverage recipe.

In some implementations, when any one ingredient among the ingredients constituting the beverage recipe is selected, the mobile terminal 2000 may allow the user to sequentially select other ingredients on the basis of the selected ingredient. Accordingly, the user can be effectively provided with a beverage recipe that is configured with desired ingredients, and conveniently brew the corresponding beverage through the beverage-making apparatus 1000, based on the selected ingredients.

FIGS. 11A to 11D are diagrams illustrating another example of the operations performed by the mobile terminal 2000 according to an implementation.

Figure 11A:
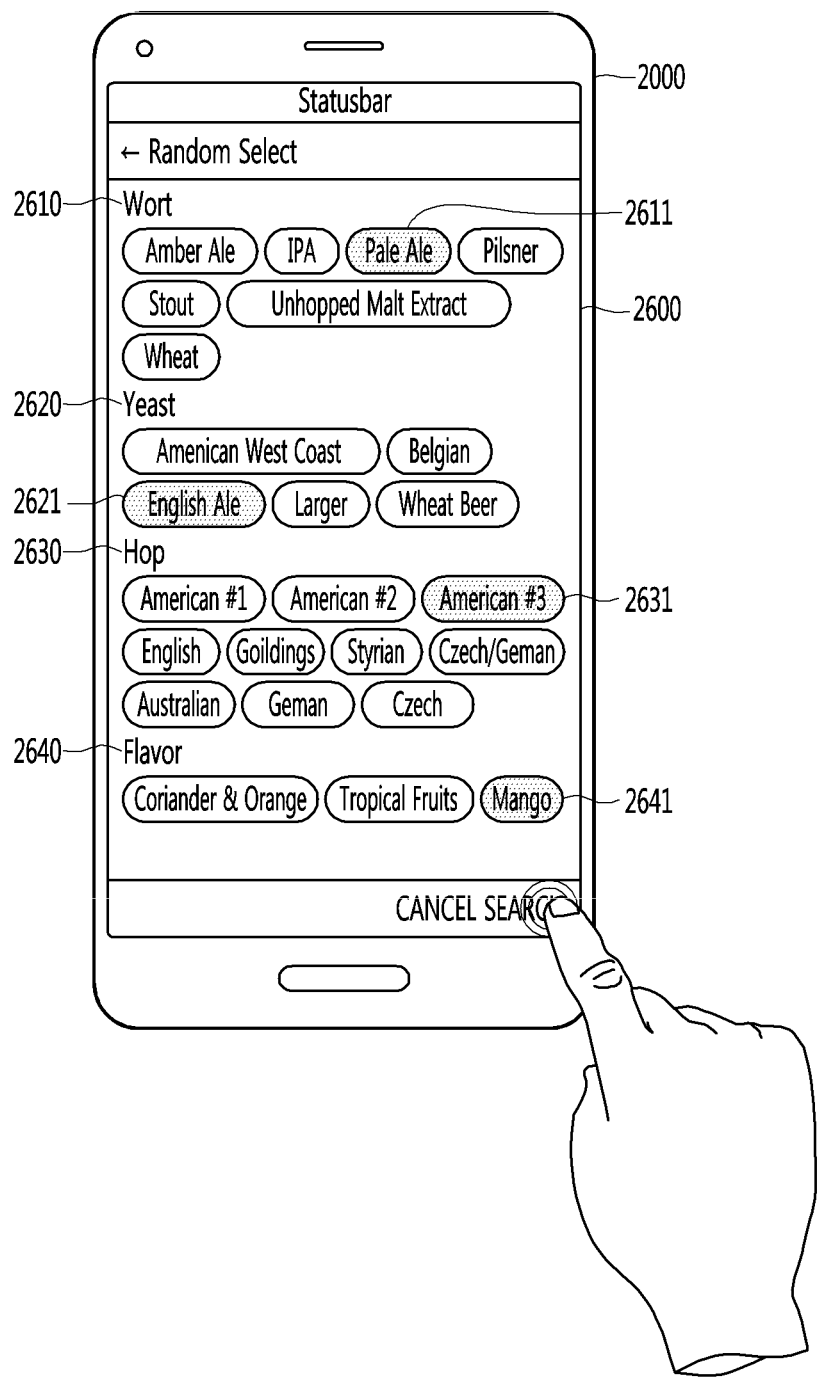
FIGS. 11A to 11D are diagrams illustrating another implementation of user interfaces providing a recipe for making a beverage using a beverage-making apparatus, performed by the mobile terminal.

Referring to FIG. 11A, the controller 2080 may display a tag selection screen 2600 including a plurality of tags respectively representing beverage ingredients. Each of the plurality of tags may include information on a name of each of the beverage ingredients.

The tag may be identifying information, such as a word, keyword, or phrase, that is used when specific information is searched. For example, each of the plurality of tags may correspond to any one word, keyword, or phrase. For example, the tag may be implemented as a hash tag to which a hash symbol (#) is provided, or any other suitable implementation of identifying information.

The controller 2080 may display the plurality of tags to be distinguished from one another according to ingredient categories. For example, a plurality of tags included in a first ingredient category 2610 (e.g., wort) may be displayed in a first region, and a plurality of tags included in a second ingredient category 2620 (e.g., yeast) may be displayed in a second region. In addition, a plurality of tags included in a third ingredient category 2630 (e.g., hop) may be displayed in a third region, and a plurality of tags included in a fourth ingredient category 2640 (e.g., flavor additive) may be displayed in a fourth region.

Figure 11B:
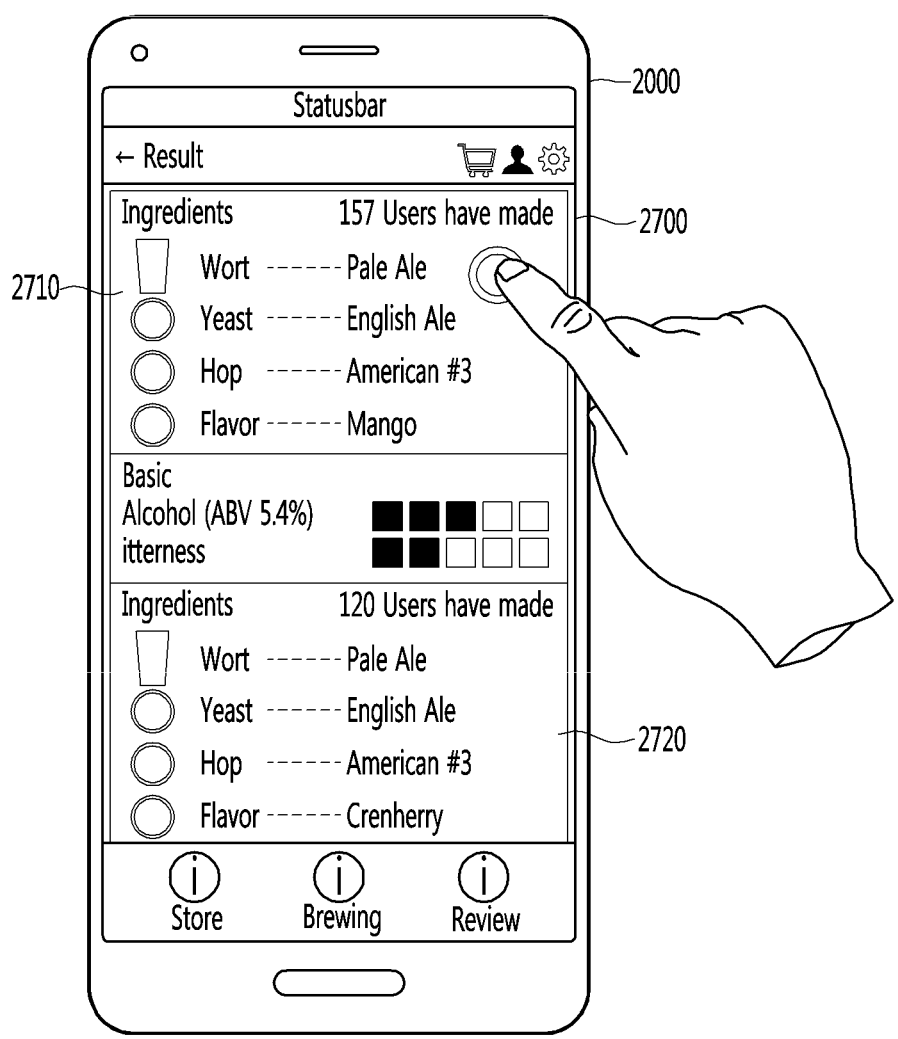

Referring to FIGS. 11A and 11B, the controller 2080 may receive an input for selecting at least one of the plurality of displayed tags. The controller 2080 may search, from a server or memory 2070 or any other suitable source of information, beverage recipe information including at least one beverage ingredient corresponding to the selected at least one tag, in response to the received input.

As a search result, the controller 2080 may display, on a search result screen 2700, beverage recipe information 2710 and 2720 that include one or more ingredients from among the at least one beverage ingredient that were selected. When the number of searched beverage recipe information is plural, the controller 2080 may display the plurality of beverage recipe information in an order based on the number of selected ingredients that are included in the beverage recipe information. For example, recipes that include a greater number of selected ingredients may be displayed with higher priority than recipes that include fewer selected ingredients.

FIG. 11A shows an example of a beverage-making apparatus being a beer-maker. In such scenarios, at least one tag selected by the user may include a tag 2611 corresponding to 'pale Ale,' a tag 2621 corresponding to 'English Ale,' a tag 2631 corresponding to 'American #3,' and a tag 2641 corresponding to 'Mango.' The controller 2080 may search beer recipe information including at least some of 'Pale Ale,' 'English Ale,' 'American #3,' and 'Mango,' based on the selected tags 2611, 2621, 2631, and 2641.

The controller 2080 may provide, as a search result, first recipe information 2710 including all of 'Pale Ale,' 'English Ale,' 'American #3,' and 'Mango,' and second recipe information 2720 including Pale Ale,' English Ale,' and 'American #3.'

Figure 11C:
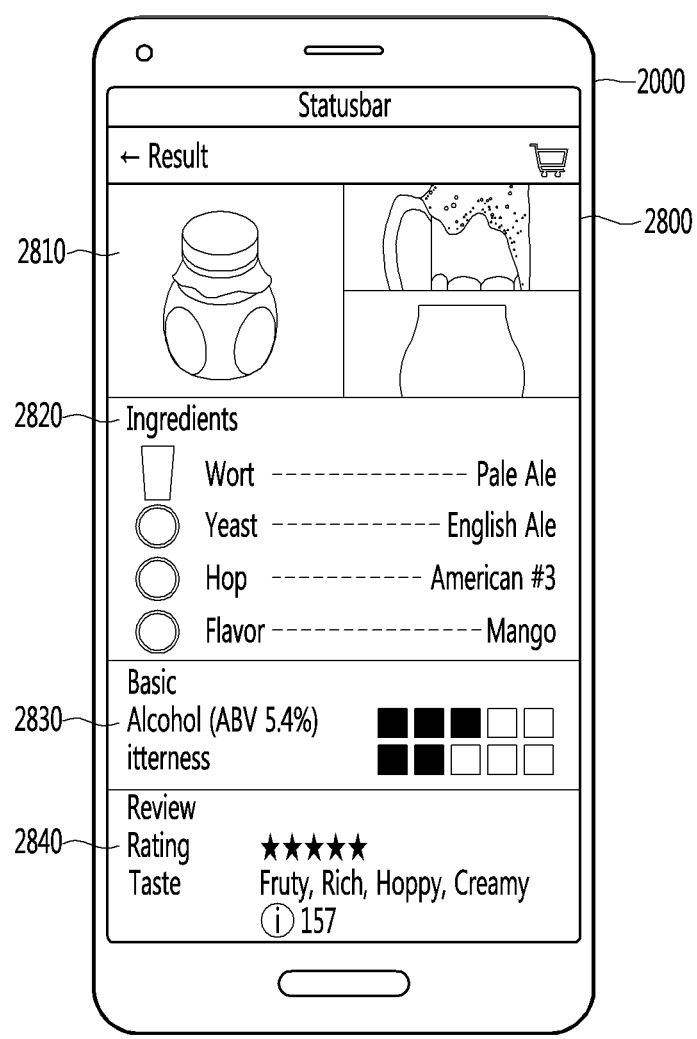
Figure 11D:
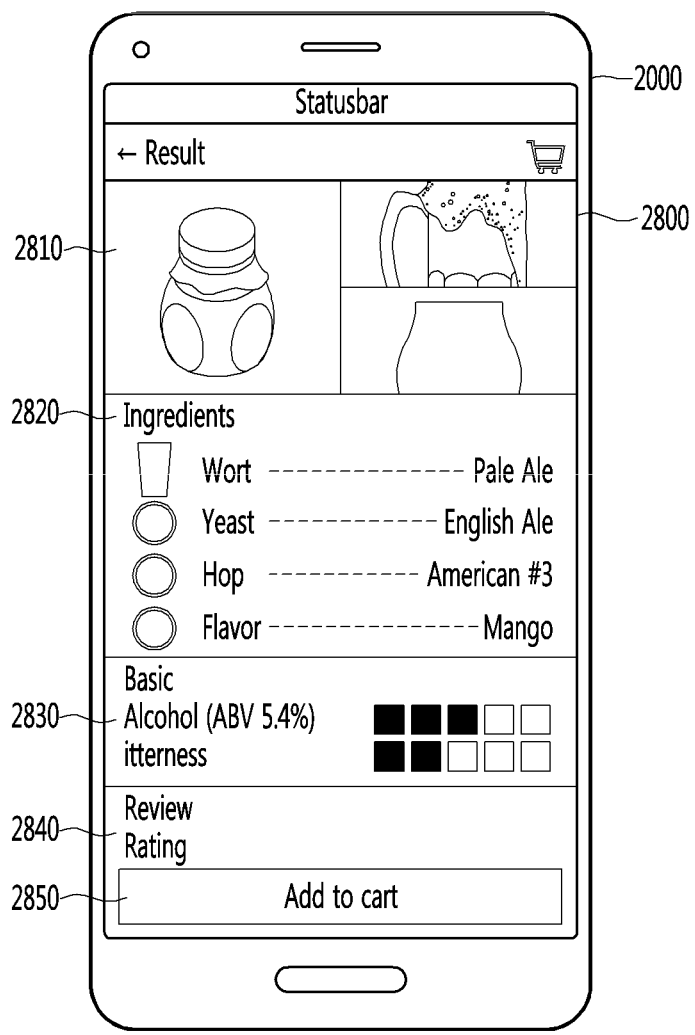

Referring to FIGS. 11B to 11D, in response to a request for selecting any one 2710 of the beverage recipe information 2710 and 2720 displayed on the search result screen 2700, the controller 2080 may display detailed information screen 2800 on the selected beverage recipe information 2710.

For example, the detailed information screen 2800 may include an image 2810 of beverage brewed by a corresponding beverage recipe, beverage ingredients included in the beverage recipe, characteristic information 2830 of the beverage brewed by the corresponding beverage recipe, and review information 2840.

In addition, the detailed information screen 2800 may further include a purchase menu or a cart storage menu 2850, for any suitable selectable interface, for storing the beverage ingredients included in the corresponding beverage recipe in a cart, or in general for storing information indicating that a user has selected such ingredients for potential purchase.

That is, the implementation shown in FIGS. 11A to 11D, the user can conveniently search a beverage recipe including at least some of desired beverage ingredients among a plurality of beverage ingredients. Accordingly, the user can brew beverage through the beverage-making apparatus, based on desired beverage ingredients.

Figure 12:
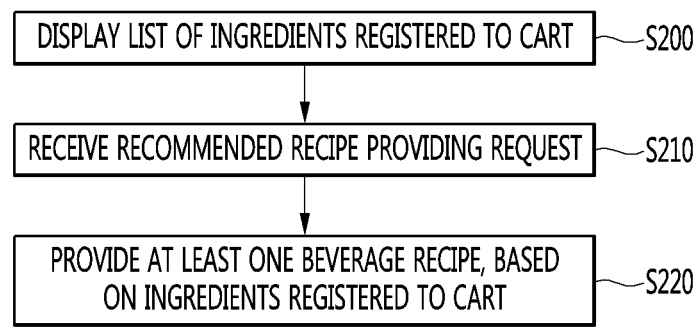
FIG. 12 is a flowchart illustrating another example of providing a recipe for making a beverage using a beverage-making apparatus, performed by the mobile terminal according to some implementations.

FIG. 12 is a flowchart illustrating another example of operations performed by the mobile terminal 2000 according to the implementation.

Referring to FIG. 12, the mobile terminal 2000 may display a list of beverage ingredients that have been saved by a user for potential procurement, e.g., that have been registered to a shopping cart for potential purchase (S200). For example, an application executed in the mobile terminal 2000 may provide a cart function for storing beverage ingredients to be purchased. The controller 2080 may receive a cart storage request for each of beverage ingredients from the user, and store the beverage ingredients in the cart in response to the received requests. In general, the controller 2080 may store information indicating that a user has saved such ingredients for potential procurement, e.g., by registering the ingredients to a shopping cart.

The mobile terminal 200 may receive a request from the user to recommend a recipe (S210), and provide at least one beverage recipe information, based on the beverage ingredients that have been saved for potential procurement, e.g., registered to the shopping cart, in response to the received request (S220). The at least one beverage recipe information may indicate one or more recipes that are determined to be suitable for the ingredients that have been selected and stored by the user. The recipe information may be provided based on information about apparatus 1000 that has been acquired by terminal 2000.

The operations shown in FIG. 12 will be described in more detail with reference to FIGS. 13A to 13C.

Figure 13A:
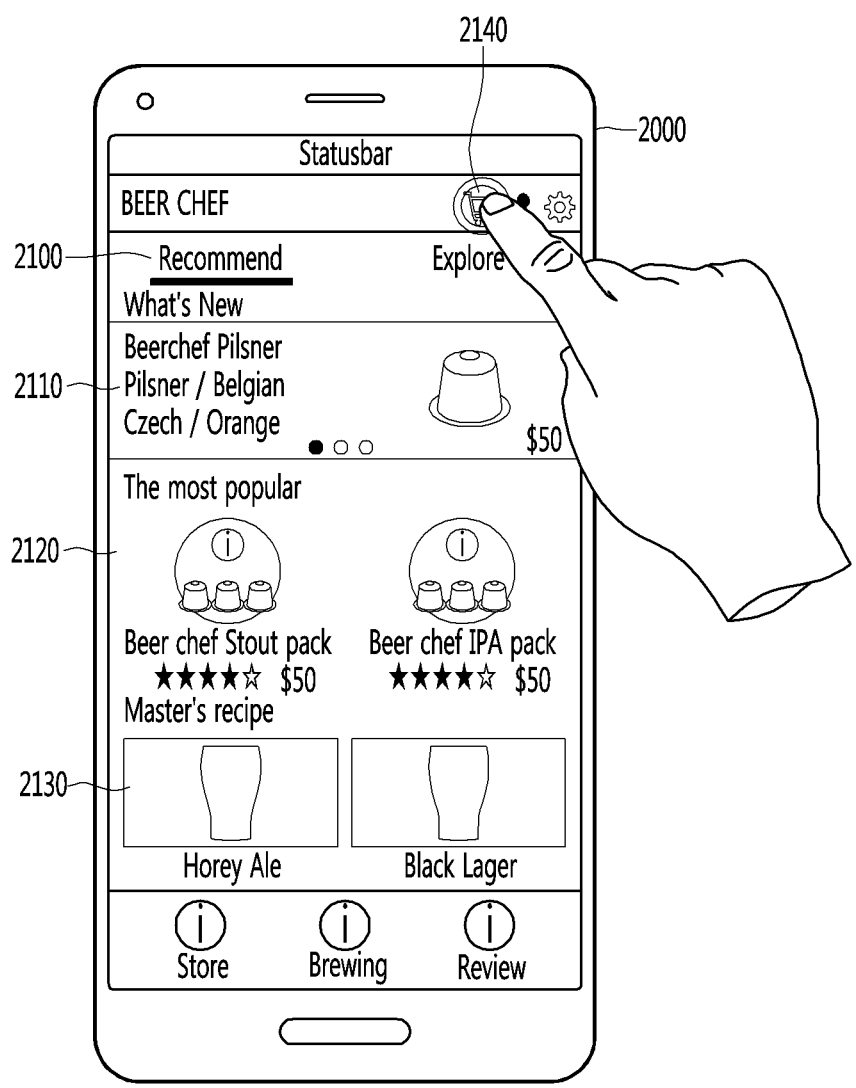
FIGS. 13A to 13C are diagrams illustrating examples of user interfaces related to providing a recipe for making a beverage using a beverage-making apparatus, as shown in FIG. 12.
Figure 13B:
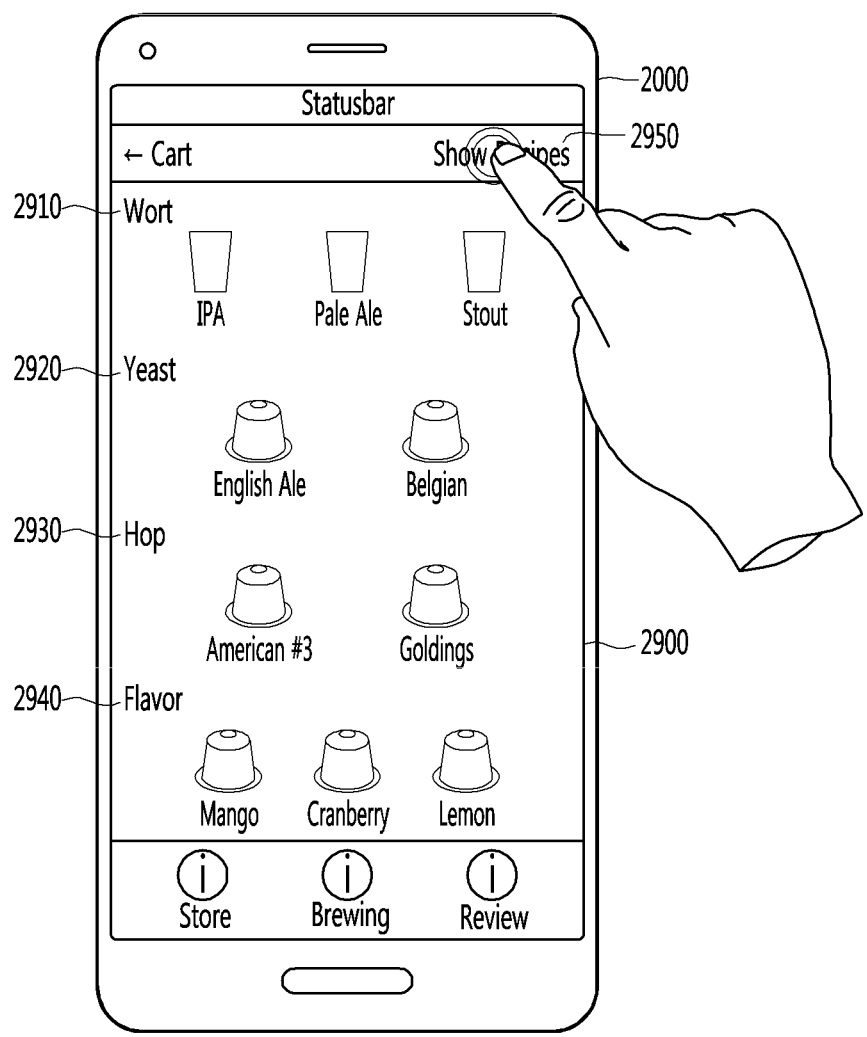
Figure 13C:
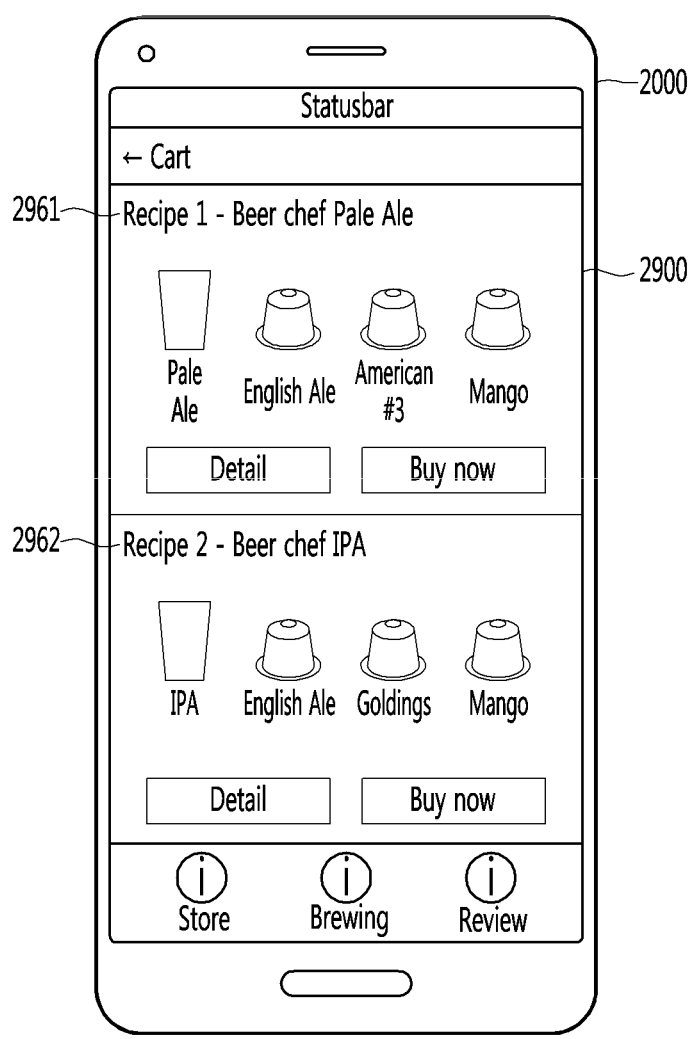

FIGS. 13A to 13C are diagrams illustrating examples of user interface screens related to the operations of FIG. 12.

Referring to FIGS. 13A and 13B, the controller 2080 may receive a request to view ingredients that have been saved for potential procurement, e.g., a request to view a shopping cart by selecting a cart icon 2140, through the user input unit 2023. The controller 2080 may display a cart screen 2900 through the display unit 2051 in response to the received request. For example, the cart screen 2900 may display a list of beverage ingredients registered to a cart.

In some implementations, the controller 2080 may display the beverage ingredients registered to the cart to be distinguished from one another, based on ingredient categories. Referring to FIG. 13B, the controller 2080 may display beverage ingredients included in a first ingredient category 2910 in a first region, display beverage ingredients included in a second ingredient category 2920 in a second region, display beverage ingredients included in a third ingredient category 2930 in a third region, and display beverage ingredients included in a fourth ingredient category 2940 in a fourth region.

The controller 2080 may receive a request from a user to view recommended recipes that are suitable for the selected and stored ingredients. For example, the controller 2080 may receive a recommended recipe providing request based on the beverage ingredients that have been saved for potential procurement, e.g., ingredients that have been registered to a shopping cart. Such a request may be received through the user input unit 2023, or through any suitable input of the mobile terminal 2000. For example, the controller 2080 may receive the recommended recipe providing request by receiving an input for selecting a recommended recipe display icon 2950 included in the cart screen 2900.

Referring to FIG. 13C, the controller 2080 may display beverage recipe information 2961 and 2962. Such recipe information may, in some implementations, include only the beverage ingredients that have been saved for potential procurement, e.g., ingredients that have been registered to the shopping cart or including at least some of the beverage ingredients registered to the cart. The beverage recipe information 2961 and 2962 may include names of beverage recipes, information of beverage ingredients, detailed information on the beverage recipes, and/or purchase menus of the beverage ingredients included in the beverage recipes.

For example, when a purchase request for beverage ingredients included in first beverage recipe information 2961 out of the displayed recipe information 2961 and 2962 is received, the controller 2080 may provide a purchasing function of the beverage ingredients. Accordingly, the user can selectively and conveniently purchase beverage ingredients constituting a beverage recipe, among a plurality of beverage ingredients that have been saved for potential procurement, e.g., ingredients that have been registered to a shopping cart.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet).

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processes described herein, such as those illustrated in FIGS. 8 and 12, may be executed entirely by a user's mobile terminal (e.g., mobile terminal 2000) executing an application, or may be executed entirely by a server system that hosts the application, or may be executed by any combination of user-side and server-side processing.

The foregoing implementations are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be implemented in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a wireless communication unit configured to communicate with a beverage-making apparatus, which includes a fermentation tank and a supplier connected to the fermentation tank;
a display unit; and
at least one processor that is configured to:
receive a first request for selecting a first ingredient included in a first ingredient category among a plurality of ingredient categories for making a beverage with the beverage-making apparatus;
display at least one recommended second ingredient, among a plurality of second ingredients included in at least one second ingredient category, that is determined based on the selected first ingredient;
receive a second request for selecting a second ingredient among the at least one recommended second ingredient that is displayed; and
display, through the display unit, beverage recipe information related to a beverage-making recipe that includes the selected first ingredient and the selected second ingredient for making the beverage using the beverage-making apparatus;
wherein the first ingredient is accommodated in a beverage ingredient pack that is configured to be inserted into the fermentation tank, and
wherein the second ingredient is accommodated in a capsule that is configured to be inserted into the supplier.

2. The mobile terminal of claim 1, wherein the at least one processor is further configured to:
acquire the beverage recipe information including the selected first ingredient and the selected second ingredient from at least one memory device of the mobile terminal or from at least one computer that is communicative to the mobile terminal.

3. The mobile terminal of claim 1, wherein the at least one second ingredient category comprises a plurality of second ingredient categories other than the first ingredient category, and
wherein the at least one processor is further configured to display the at least one recommended second ingredient by:
displaying a plurality of recommended second ingredients, each recommended second ingredient included in a respective second ingredient category among the plurality of second ingredient categories, and the plurality of recommended second ingredients that are displayed being determined based on the selected first ingredient.

4. The mobile terminal of claim 1, wherein the at least one processor is further configured to:
display at least one recommended third ingredient among a plurality of third ingredients included in a third ingredient category, the at least one recommended third ingredient determined based on the selected first ingredient and the selected second ingredient;
receive a request for selecting a third ingredient among the at least one recommended third ingredient that is displayed;
display at least one recommended fourth ingredient among a plurality of fourth ingredients included in a fourth ingredient category, that is determined based on the selected first ingredient, the selected second ingredient, and the selected third ingredient;
receive a request for selecting a fourth ingredient among the at least one recommended fourth ingredient that is displayed; and
display, through the display unit, the beverage recipe information related to the beverage-making recipe that further includes the selected third ingredient and the selected fourth ingredient.

5. The mobile terminal of claim 4, wherein the first ingredient category is a wort category.

6. The mobile terminal of claim 5, wherein the second ingredient category, the third ingredient category, and the fourth ingredient category include a yeast category, a hop category, and a flavor additive category.

7. The mobile terminal of claim 1, wherein the at least one processor is further configured to:
in response to a request for selecting the displayed beverage recipe information, display additional information regarding the selected beverage recipe information,
wherein the additional information regarding the selected beverage recipe information comprises at least one of information regarding ingredients included in the beverage-making recipe corresponding to the beverage recipe information, information regarding at least one characteristic of the beverage made by the beverage-making apparatus using the beverage-making recipe, or information regarding at least one user review of the beverage made by the beverage-making apparatus using the beverage-making recipe.

8. At least one non-transitory computer-readable recording medium encoded with at least one computer program comprising instructions that, when executed, operate to cause a mobile terminal communicative with a beverage-making apparatus to perform operations comprising:
receiving a first request for selecting a first ingredient included in a first ingredient category among a plurality of ingredient categories for making a beverage with the beverage-making apparatus;
displaying at least one recommended second ingredient, among a plurality of second ingredients included in at least one second ingredient category, that is determined based on the selected first ingredient;
receiving a second request for selecting a second ingredient among the at least one recommended second ingredient that is displayed; and
displaying, through a display unit of the mobile terminal, beverage recipe information related to a beverage-making recipe that includes the selected first ingredient and the selected second ingredient for making the beverage using the beverage-making apparatus,
wherein the first ingredient is accommodated in a beverage ingredient pack that is configured to be inserted into a fermentation tank of the beverage-making apparatus,
wherein the second ingredient is accommodated in a capsule that is configured to be inserted into a supplier of the beverage-making apparatus, and
wherein the supplier is connected to the fermentation tank.

9. The computer-readable recording medium of claim 8, wherein the operations further comprise:
acquiring the beverage recipe information including the selected first ingredient and the selected second ingredient from at least one memory device of the mobile terminal or from at least one computer that is communicative with the mobile terminal.

10. The computer-readable recording medium of claim 8, wherein the at least one second ingredient category comprises a plurality of second ingredient categories other than the first ingredient category among the plurality of ingredient categories, and
wherein displaying the at least one recommended second ingredient comprises:
displaying a plurality of recommended second ingredients, each recommended second ingredient included in a respective second ingredient category among the plurality of second ingredient categories, and the plurality of recommended second ingredients that are displayed being determined based on the selected first ingredient.

11. The computer-readable recording medium of claim 8, wherein the operations further comprise:
displaying at least one recommended third ingredient among a plurality of third ingredients included in a third ingredient category, the at least one recommended third ingredient matched to the selected first ingredient and the selected second ingredient;
receiving a request for selecting a third ingredient among the at least one recommended third ingredient that is displayed;
displaying at least one recommended fourth ingredient among a plurality of fourth ingredients included in a fourth ingredient category, the at least one recommended fourth ingredient matched to the selected first ingredient, the selected second ingredient, and the selected third ingredient;
receiving a request for selecting a fourth ingredient among the at least one recommended fourth ingredient that is displayed; and
displaying, through the display unit, the beverage recipe information related to the beverage-making recipe that further includes the selected third ingredient and the selected fourth ingredient.

12. The computer-readable recording medium of claim 8, wherein the operations further comprise:
in response to a request for selecting the displayed beverage recipe information, displaying additional information regarding the selected beverage recipe information,
wherein the additional information regarding the selected beverage recipe information comprises at least one of information regarding ingredients included in the beverage-making recipe corresponding to the beverage recipe information, information regarding at least one characteristic of the beverage made by the beverage-making apparatus using the beverage-making recipe, or information regarding at least one user review of the beverage made by the beverage-making apparatus using the beverage-making recipe.

13. A mobile terminal comprising:
a wireless communication unit configured to communicate with a beverage-making apparatus;
a display unit; and
at least one processor that is configured to:
receive a first request for selecting a first ingredient included in a first ingredient category among a plurality of ingredient categories for making a beverage with the beverage-making apparatus;
display at least one recommended second ingredient, among a plurality of second ingredients included in at least one second ingredient category, that is determined based on the selected first ingredient;
receive a second request for selecting a second ingredient among the at least one recommended second ingredient that is displayed; and
display, through the display unit, beverage recipe information related to a beverage-making recipe that includes the selected first ingredient and the selected second ingredient for making the beverage using the beverage-making apparatus,
wherein the first ingredient category is a wort category.

* * * * *